June 24, 1958     C. A. CHRISTOFF     2,840,310

REVERSIBLE COUNTER MECHANISM

Original Filed Nov. 16, 1953     14 Sheets-Sheet 1

INVENTOR
Chris A. Christoff
BY
ATTORNEY.

June 24, 1958 C. A. CHRISTOFF 2,840,310
REVERSIBLE COUNTER MECHANISM
Original Filed Nov. 16, 1953 14 Sheets-Sheet 2
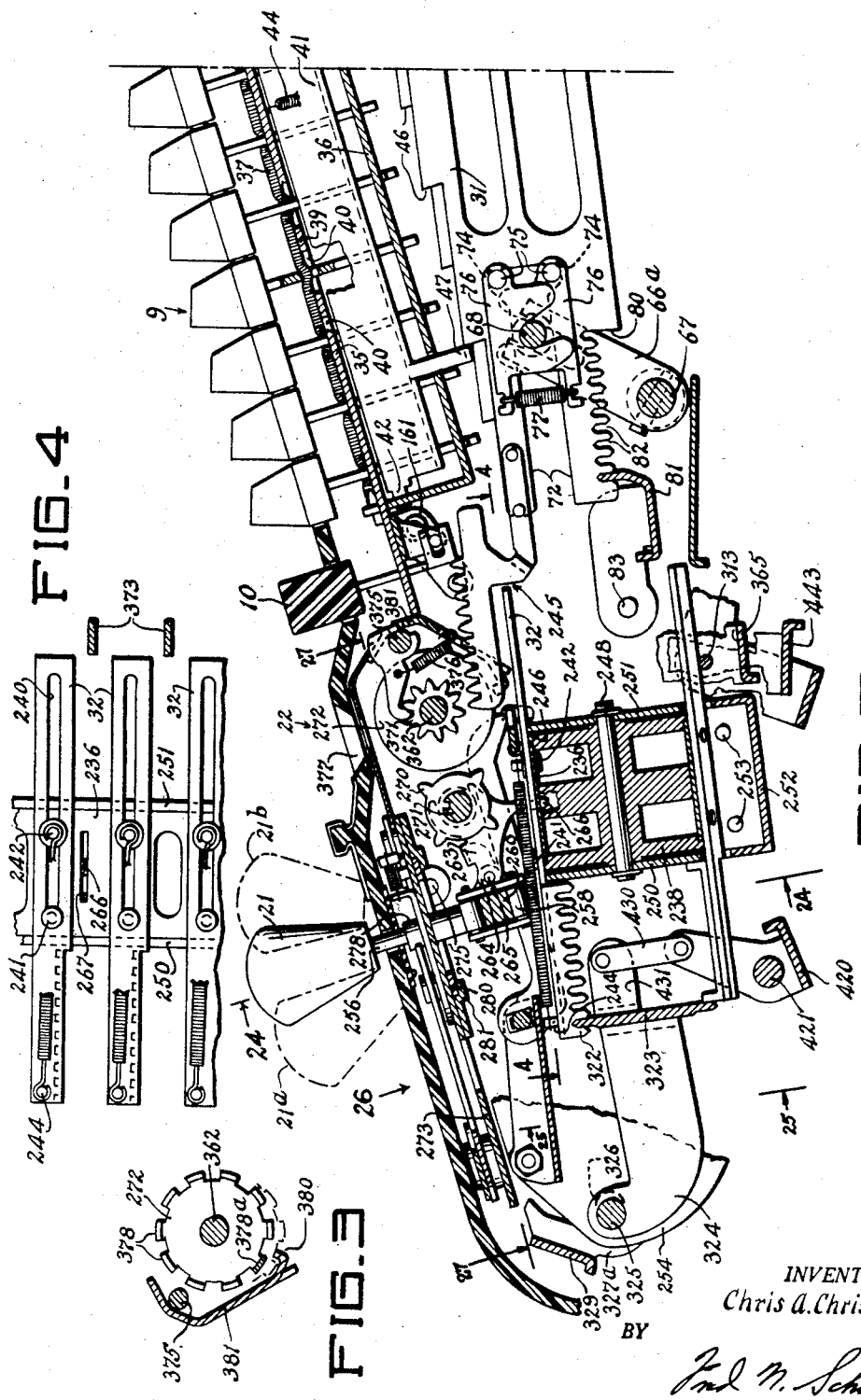
INVENTOR
Chris A. Christoff
BY
ATTORNEY June 24, 1958     C. A. CHRISTOFF     2,840,310
REVERSIBLE COUNTER MECHANISM
Original Filed Nov. 16, 1953     14 Sheets-Sheet 3

INVENTOR
Chris A. Christoff
BY
ATTORNEY.

June 24, 1958
C. A. CHRISTOFF
2,840,310
REVERSIBLE COUNTER MECHANISM
Original Filed Nov. 16, 1953
14 Sheets-Sheet 4
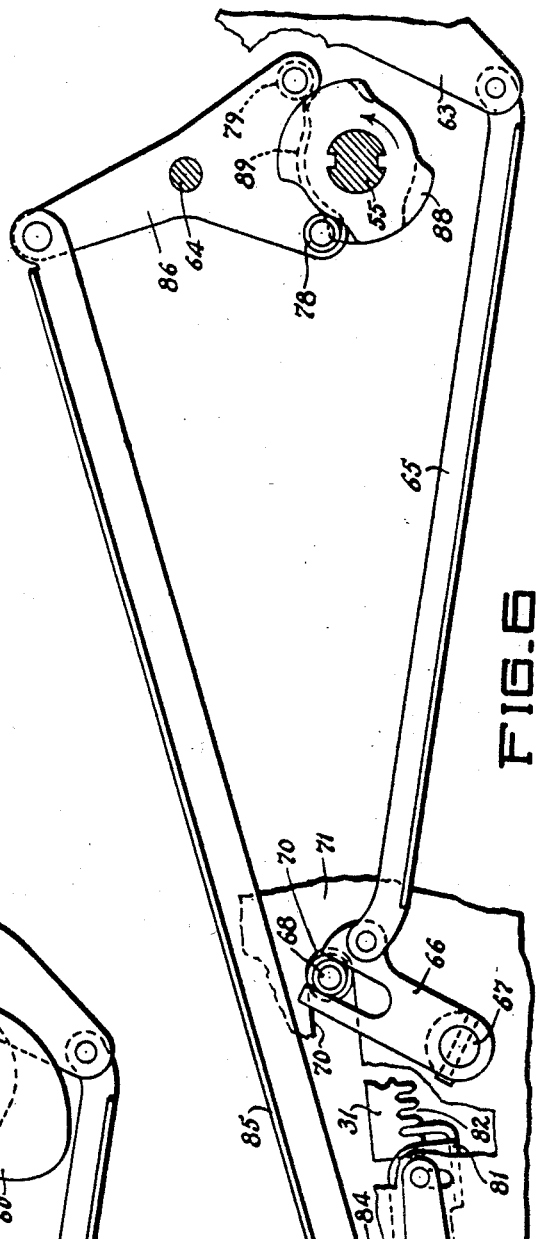
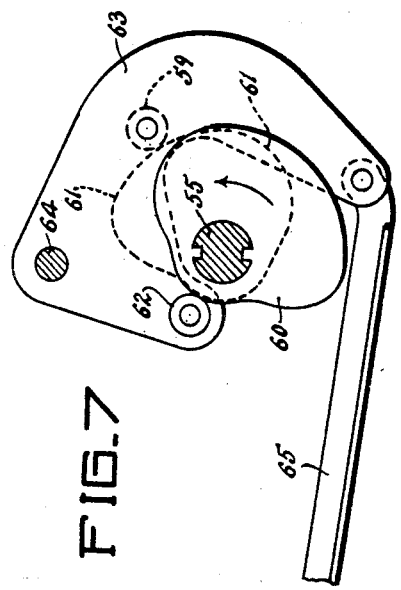
INVENTOR
Chris A. Christoff
BY
ATTORNEY.

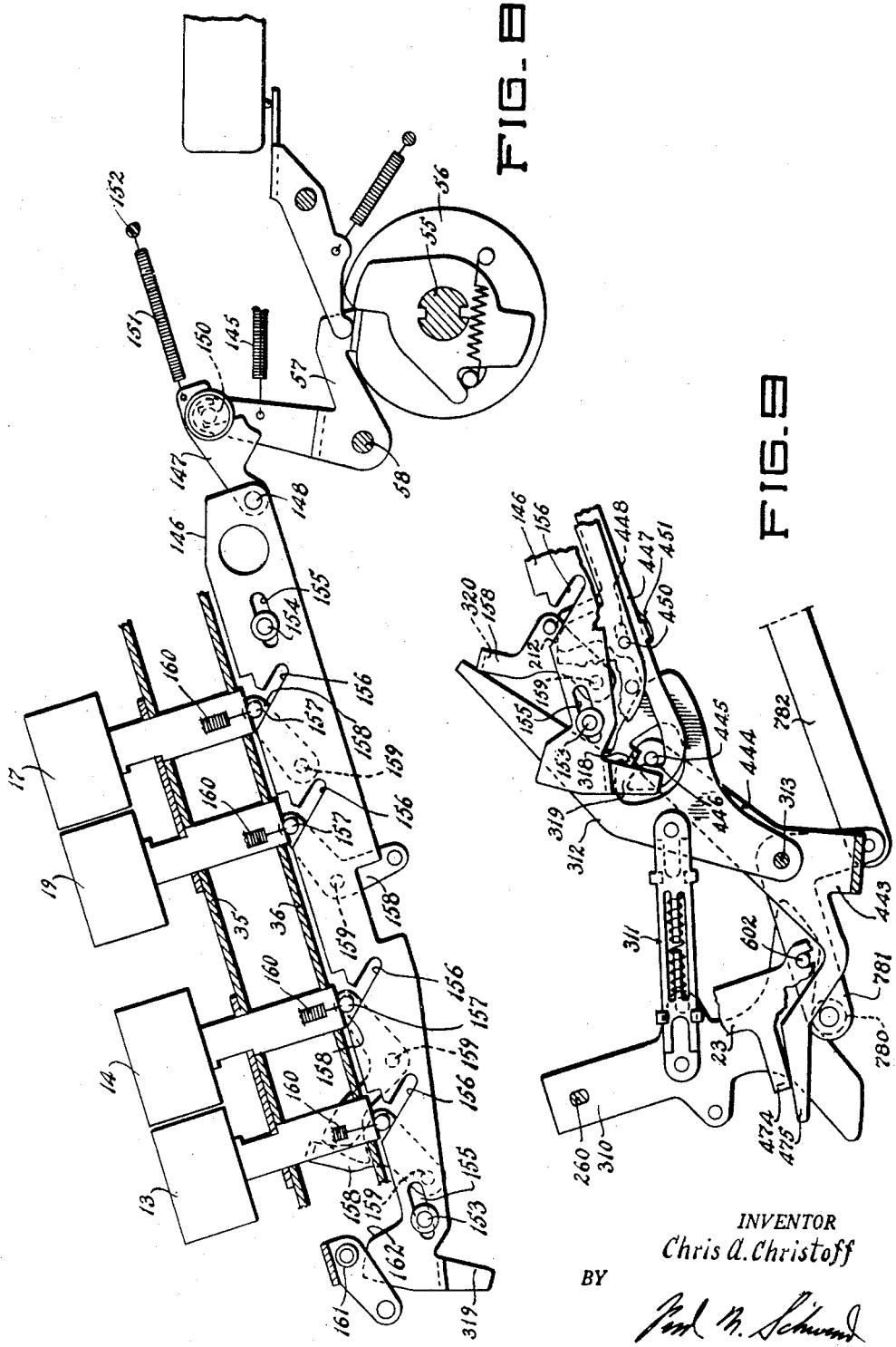

June 24, 1958    C. A. CHRISTOFF    2,840,310
REVERSIBLE COUNTER MECHANISM
Original Filed Nov. 16, 1953    14 Sheets-Sheet 6
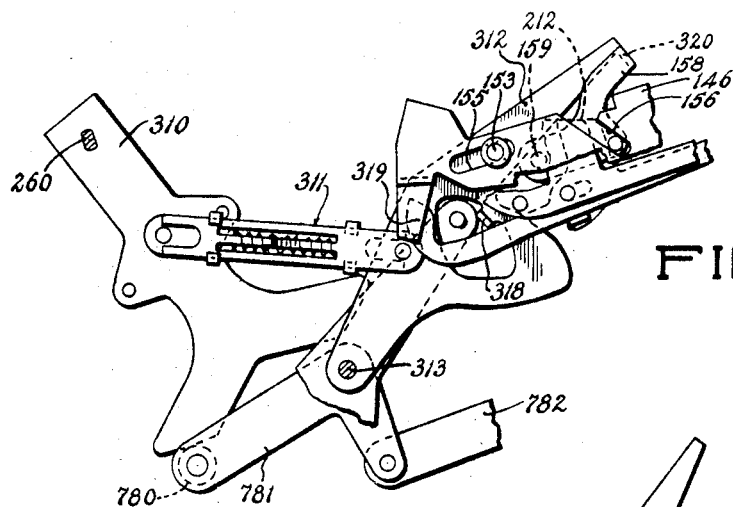
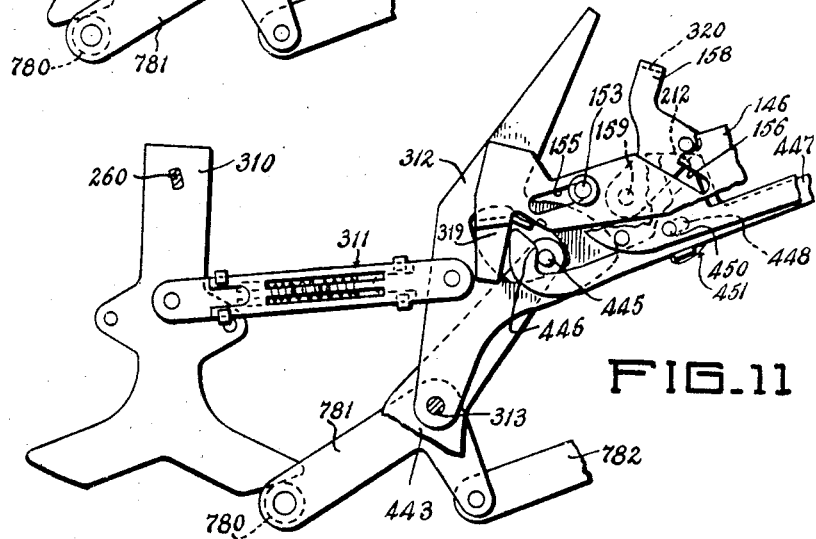
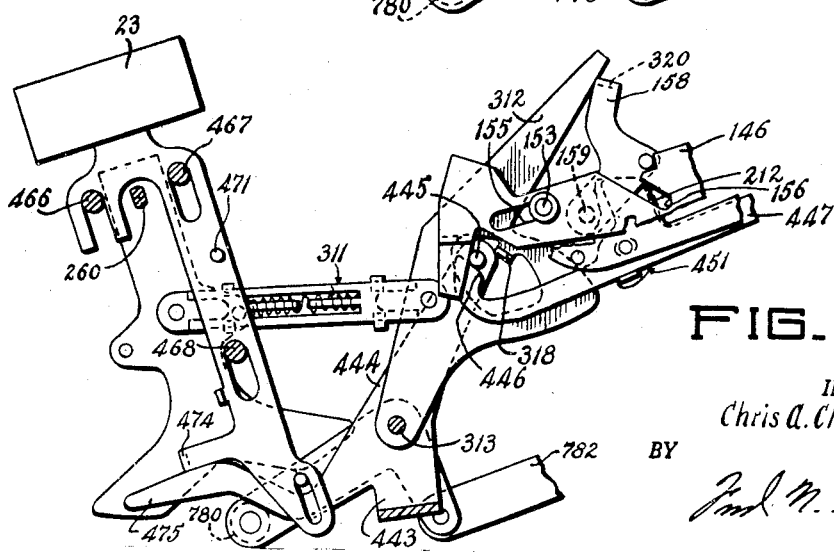
INVENTOR
Chris A. Christoff
BY
ATTORNEY.

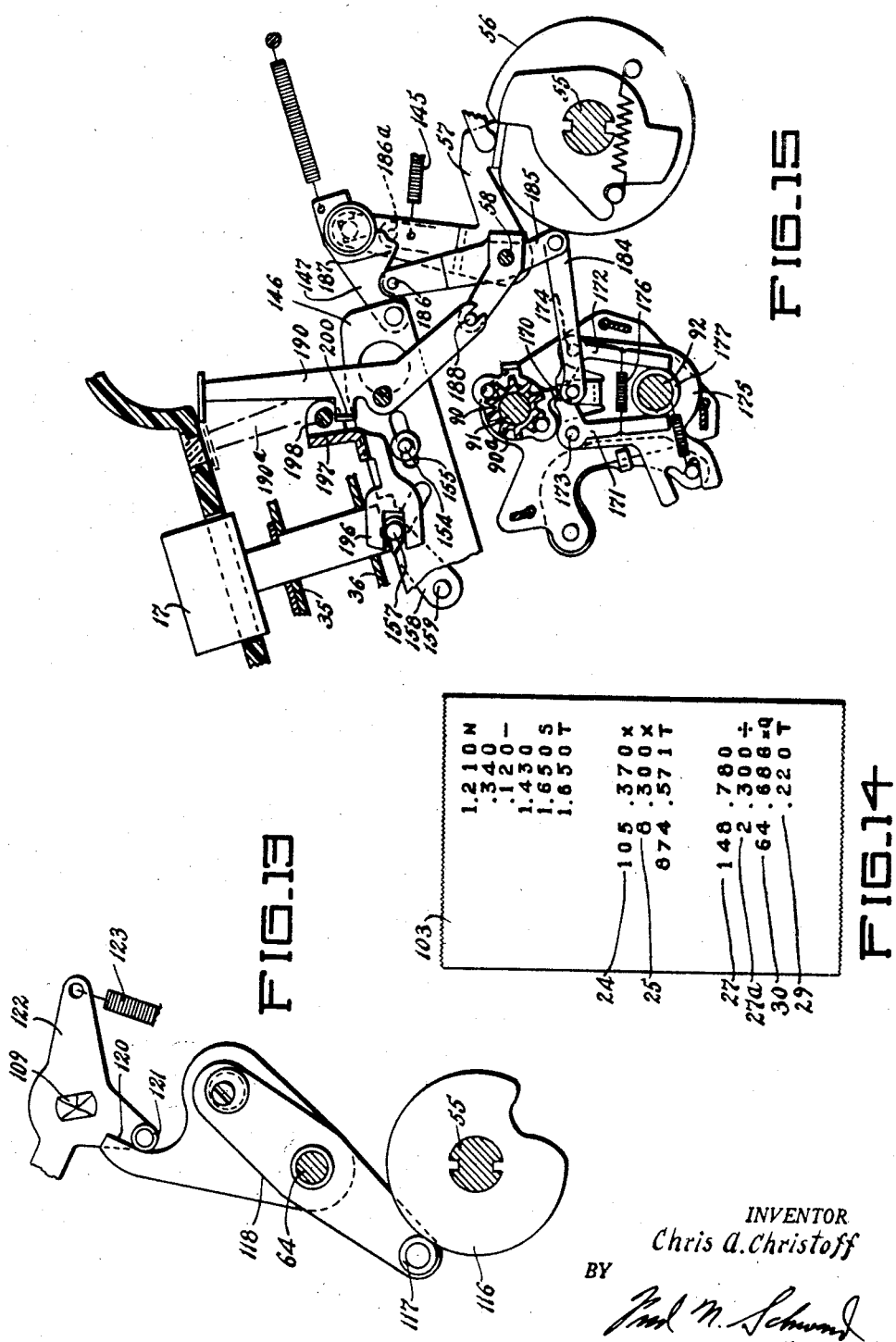

June 24, 1958  C. A. CHRISTOFF  2,840,310
REVERSIBLE COUNTER MECHANISM
Original Filed Nov. 16, 1953  14 Sheets-Sheet 8

INVENTOR
Chris A. Christoff
BY
ATTORNEY.

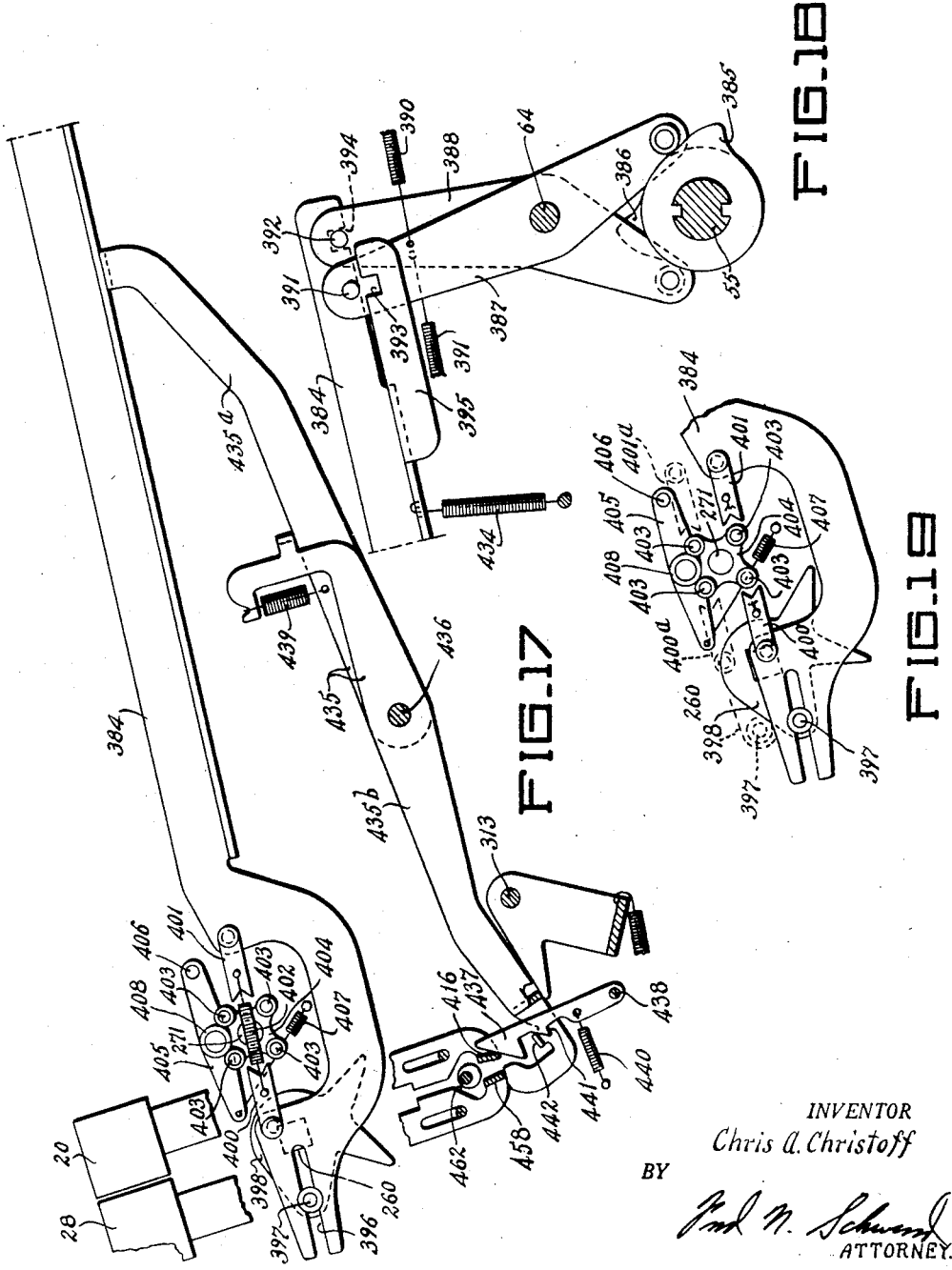

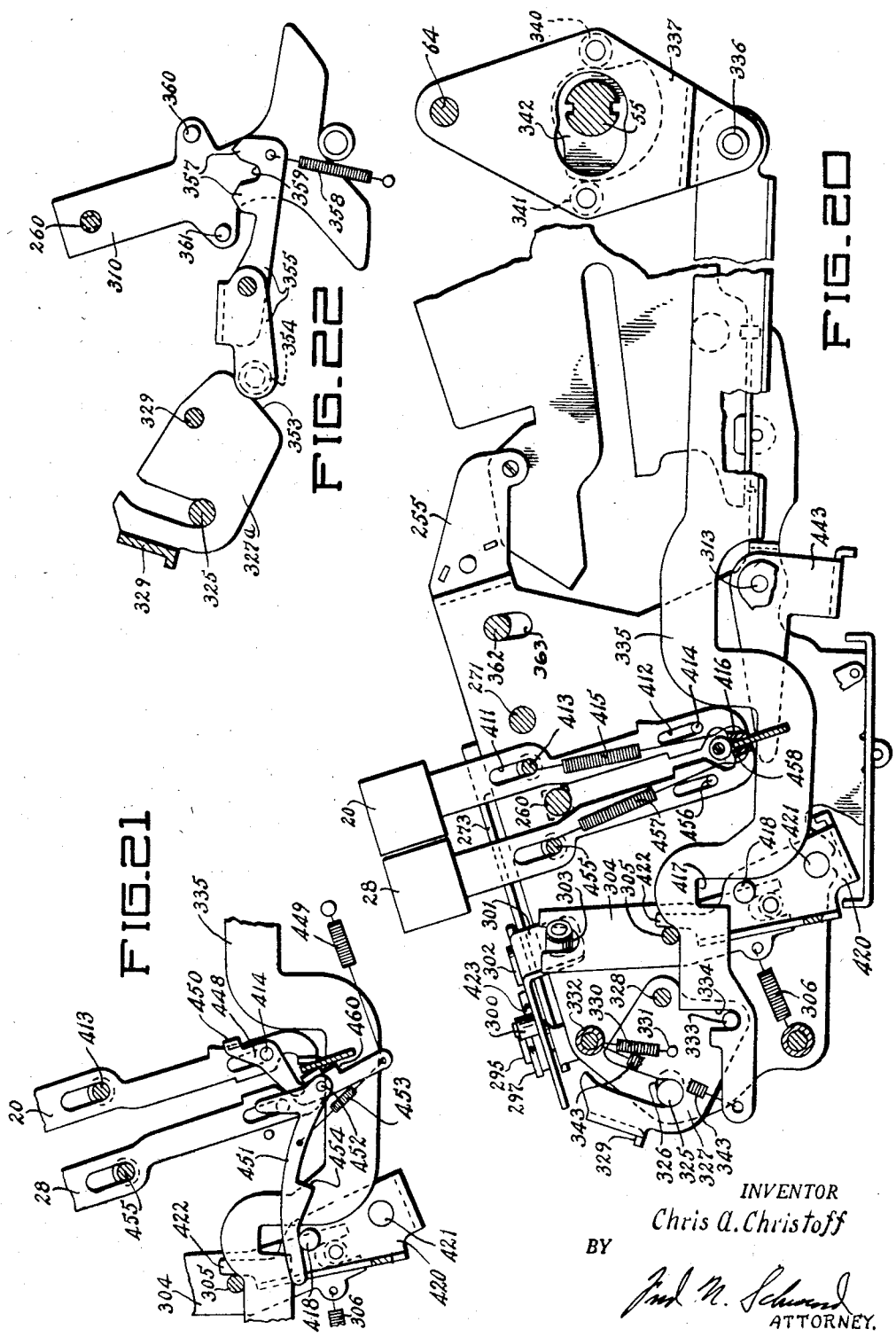

June 24, 1958  C. A. CHRISTOFF  2,840,310
REVERSIBLE COUNTER MECHANISM
Original Filed Nov. 16, 1953  14 Sheets-Sheet 11
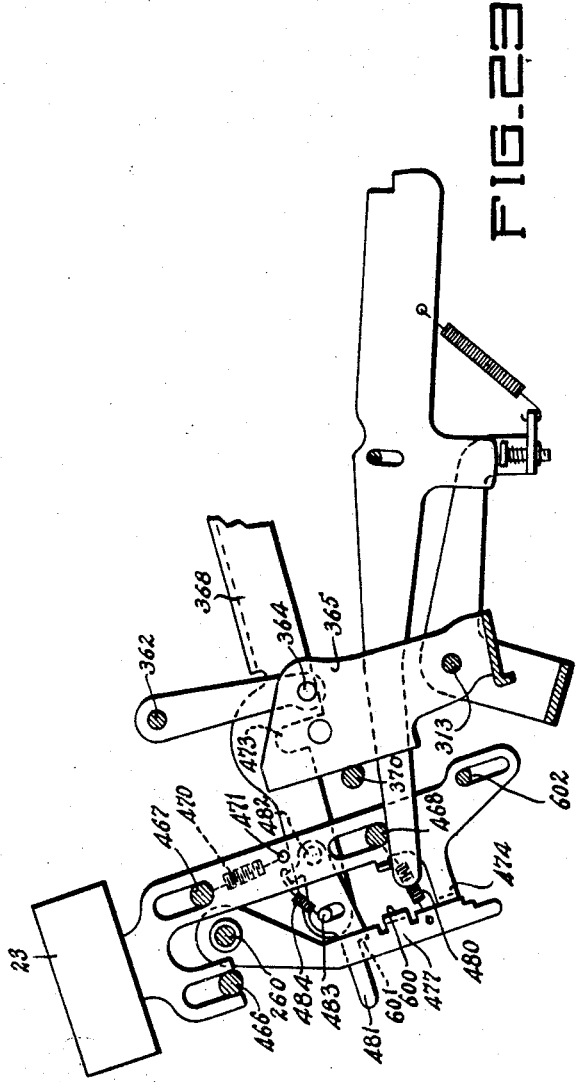
INVENTOR
Chris A. Christoff
BY
ATTORNEY.

June 24, 1958 C. A. CHRISTOFF 2,840,310
REVERSIBLE COUNTER MECHANISM
Original Filed Nov. 16, 1953 14 Sheets-Sheet 12

INVENTOR
Chris A. Christoff
BY
*Fred N. Schwend*
ATTORNEY.

June 24, 1958 C. A. CHRISTOFF 2,840,310
REVERSIBLE COUNTER MECHANISM
Original Filed Nov. 16, 1953 14 Sheets-Sheet 13

INVENTOR
Chris A. Christoff
BY
ATTORNEY.

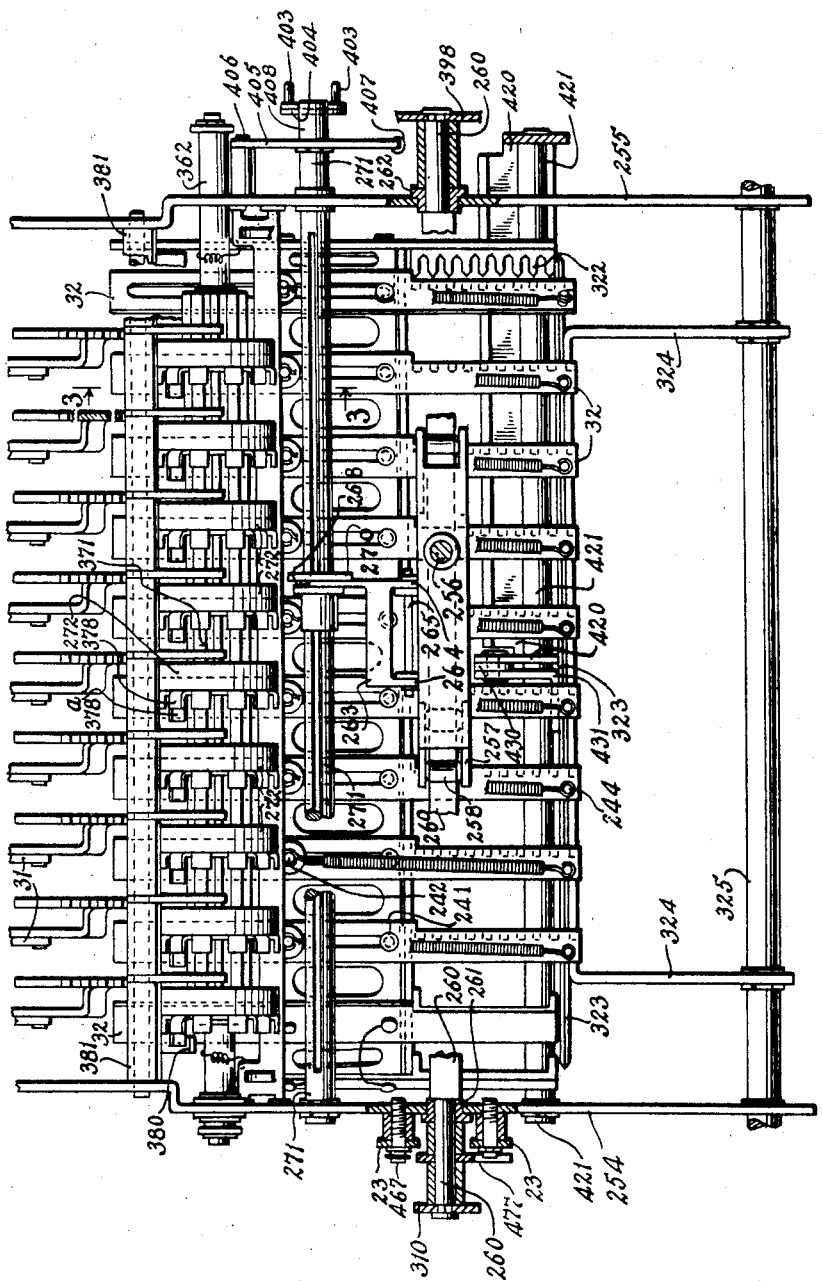

United States Patent Office 2,840,310
Patented June 24, 1958

2,840,310

REVERSIBLE COUNTER MECHANISM

Chris A. Christoff, San Gabriel, Calif., assignor to Clary Corporation, a corporation of California Original application November 16, 1953, Serial No. 392,294. Divided and this application January 3, 1955, Serial No. 479,303

7 Claims. (Cl. 235—79)

This invention relates to calculating machines of the type capable of performing the four cardinal calculations; i. e., addition, subtraction, multiplication and division, and including instrumentalities for indicating and recording the factors and results of such calculations.

The present application is a division of the co-pending application Serial No. 392,294, filed on November 16, 1953, and entitled "Calculating Machine." Reference is had to said application for a complete disclosure of a calculating machine in which the present invention is embodied. It is to be understood, however, that the invention may be equally well embodied in other forms of calculating machines.

Also, the calculating machine illustrated herein is based partly on the well-known Clary adding machine, portions of which are disclosed and claimed in the following United States patents: No. 2,472,696, issued on June 7, 1949, to E. P. Drake; No. 2,490,200, issued on December 6, 1949, to R. E. Boyden; No. 2,492,263, issued on December 27, 1949, to R. E. Boyden; No. 2,506,337, issued on May 2, 1950, to R. E. Boyden; and No. 2,583,810, issued on January 29, 1952, to R. E. Boyden.

A principal object of the present invention is to provide an improved mechanism for automatically setting a cycle counter for a calculator to properly register multiplier factors and quotient results during performance of multiplication and division calculations.

Another object is to provide a mechanism for automatically actuating a cycle counter for a calculating machine of the reciprocating actuator type in order to properly register multiplier factors and quotient results.

A further object is to modify a recording adding and subtracting machine to facilitate solving of problems in division and multiplication.

The manner in which the above and other objects of the invention are accomplished will be readily understood on reference to the following specification when read in conjunction with the accompanying drawings, wherein:

Fig. 2 is a partial longitudinal sectional view through the machine which, combined with Fig. 5, is taken along the line 2:5—2:5 of Fig. 1 and also line 2—2 of Fig. 24.

Fig. 3 is a transverse sectional view through the multiplier-quotient counter and is taken along the line 3—3 of Fig. 27.

Fig. 4 is a sectional plan view illustrating the multiplicand divisor slide construction and is taken substantially along the line 4—4 of Fig. 2.

Fig. 6 is a side view illustrating the rack lock controls and part of the rack drive instrumentalities.

Fig. 7 is a side view illustrating the rack drive cams and cam follower.

Fig. 8 is a sectional side elevational view taken along the left-hand side of the machine and illustrating the motor and clutch controls.

Fig. 9 is a side elevational view illustrating the clutch and accumulator controls associated with the multiply-divide lever.

Figs. 10, 11 and 12 are similar to Fig. 9 but illustrate the mechanism in different conditions.

Fig. 13 is a side view of the printer control mechanism.

Fig. 14 is a view of a sample tape having recorded thereon the factors and results of different types of computation performed by the machine.

Fig. 15 is a fragmentary side elevational view illustrating the overdraft controls for arresting operation of the machine.

Fig. 17 is an elevational view, taken along the right-hand side of the machine, illustrating the multiplier-quotient counter actuating mechanism in a neutral position.

Fig. 18 is a side view of the cams and cam followers operatively associated with the counter actuator of Fig. 17.

Fig. 19 is a view similar to that of Fig. 17 but showing the counter actuator in an alternate position.

Fig. 20 is a side view, taken along the right-hand side of the machine, illustrating part of the controls for the multiply-divide control mechanism.

Fig. 21 is a fragmentary view illustrating the means for latching the divisor entry and the multiplicand entry keys in depressed positions.

Fig. 22 is a sectional view taken along the line 22—22 of Fig. 26 illustrating the multiply-divide handle locating mechanism.

Fig. 23 is a side view, taken along the left-hand side of the machine, illustrating part of the mechanism controlled by the multiplier-quotient bar.

Fig. 27 is a sectional plan view similar to Fig. 26, but is taken substantially along the line 27—27 of Fig. 2.

*General arrangement*

The present machine is motor driven under control of various motorized control bars and a multiply-divide control lever. The latter controls are arranged to be operated in various sequences in order to perfom various desired calculations or combinations of such calculations, including addition, subtraction, division and multiplication.

A rotary drive shaft operated by the motor is provided to effect various machine functions, the drive shaft carrying various control cams for operating respective units of the machine. The drive shaft is effective under control of a cyclic clutch to rotate one complete revolution for each machine cycle.

Figure 1:
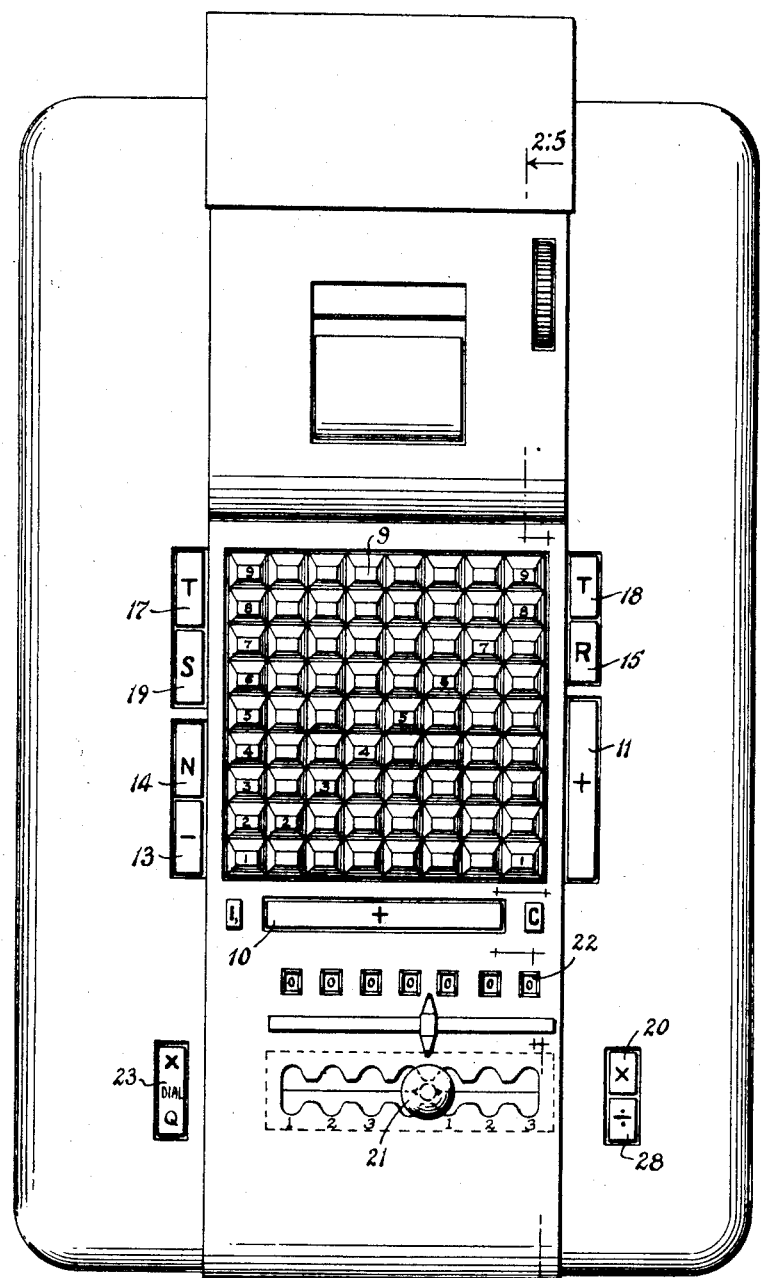
Fig. 1 is a plan view of a machine embodying a preferred form of the present invention.

Referring in general to Fig. 1, an amount to be added or subtracted, the dividend and the divisor in the case of a division calculation, and the multiplicand factor in the case of a multiplication calculation, is entered into the machine by depressing appropriate amount keys 9 of the machine keyboard.

In order to add an amount, one or the other of two add bars 10 and 11 is depressed, causing a cycle of operation of the machine to add the amount into an accumulator 8 (Fig. 5) and to print this factor on a paper strip 103. If the amount set up on the keys 9 is to be subtracted from an amount registered on the accumulator, a minus bar 13 is depressed.

If it is desired to print an amount set up on the keys but not to enter the same into the accumulator or other calculating units, a non-add bar 14 is depressed. In order to add the same amount into the accumulator two or more times, a repeat bar 15 is depressed and held down until the requisite number of cycles, one for each addition, are made by the machine.

When it is desired to obtain the net total amount registered by the accumulator, one or the other of two total bars 17 and 18 is depressed. This will print the total and clear the accumulator to zero. In the event, however, it is desired to obtain a sub-total, a sub-total bar 19 is depressed, causing the amount registered in the accumulator to be printed but retained in the accumulator.

In performing multiplication calculations, the multiplicand is entered into the amount keys 9 and a multiplicand entry key 20 is depressed, transferring the amount from the keys into a multiplicand-divisor storage unit to be described hereinafter. At this time the printing mechanism is actuated to record the multiplicand as at 24 (Fig. 14) on the recording tape 103 and the multiplier is entered into the machine by manipulation of a multiply-divide handle 21. The latter is slidable laterally of the machine into different denominational relationships relative to the amount keys and accumulator and is also rockable fore or aft of the machine to respectively effect add or subtract cycling. Thus, to obtain the product of a multiplicand factor by a multiplier factor of, for example, 23, the handle 21 would first be shifted to its tens denominational position and then rocked rearwardly and held there until the machine has additively cycled twice. Thereafter, the handle would be shifted to the right one step to its units denominational position and rocked rearwardly to effect three additive cycles of the machine. During this operation the multiplier factor of 23 would be entered into a multiplier-quotient counter 22 and the product would be accumulated in the machine accumulator.

In order to record the multiplier factor and product as well as clear the machine for subsequent calculations, a multiplier quotient key 23 would be depressed, clearing the counter 22 and printing this amount on the tape at 25, directly below the multiplicand factor 24 (Fig. 14) as indicated. Thereafter, one or the other of the total bars 17 and 18 would be depressed to total out the machine accumulator and record the product, as indicated at 26.

It should be noted that the multiplicand, multiplier and factors, and the product, are all printed in decimally correct relation and with the decimal points all in vertical alignment.

In division calculations, the dividend is first entered into the amount keys 9 and thereafter entered into the machine accumulator by depression of one or the other of the add bars 10 and 11. Obviously, such factor is printed on the tape 103, as for example, indicated at 27 (Fig. 14). The divisor is now entered into the keyboard in its proper decimal relationship relative to the dividend and a divisor entry key 28 is depressed, which effects transfer of the divisor into the multiplicand-divisor storage device and printing of the divisor at 27a. Now, the handle 21 is moved laterally and normally to the left of its initial illustrated position until the divisor factor carried by the storage device is properly aligned with the dividend registered on the accumulator. Thereupon, the handle 21 is rocked forward to cause subtractive cycling of the machine. Such cycling will continue (providing the handle is held forward) until the remainder for that denomination reaches a value lower than that of the divisor, at which time the machine automatically stops, indicating an overdrafted condition. The handle is thereafter rocked rearwardly to effect a single additive corrective cycle and is then shifted one denominational position to the right, and the foregoing procedure repeated. The net number of cycles performed in each denominational position of the handle 21 is registered on the storage device 22 in proper decimal relationship, thus indicating the result or quotient.

In order to record the quotient and clear the machine for subsequent calculation, the multiply-quotient key 23 is depressed, clearing the storage device 22 and printing the amount, i. e., quotient, on the tape as indicated at 30 (Fig. 14). The remainder now remaining in the machine accumulator is printed as at 29 and the accumulator cleared by depression of one or the other of the total bars 17 and 18.

*Keyboard*

The keyboard, including the amount keys 9 (Figs. 1, 2 and 5) is of the flexible type, and each amount key when depressed serves as a stop to limit movement of an aligned drive rack 31 which is effective, depending upon the type of calculation, to drive an associated element of the accumulator 8 to enter an amount therein corresponding to the differential movement of the rack, to set the printing mechanism to print such amount, and to set an aligned one of a series of multiplicand-divisor stop slides 32.

The keys in each row are yieldably pressed upward by a tension spring 37 extending the length of the keyboard and suitably attached at opposite ends to the key plate 35. Each spring 37 rests on cross ribs 39 formed across slots 40 in the key plate and also extends through openings in the various key stems. Upon depression of a key, the adjacent portions of the associated spring 37 are stretched and extend through the slot 40.

Figure 5:
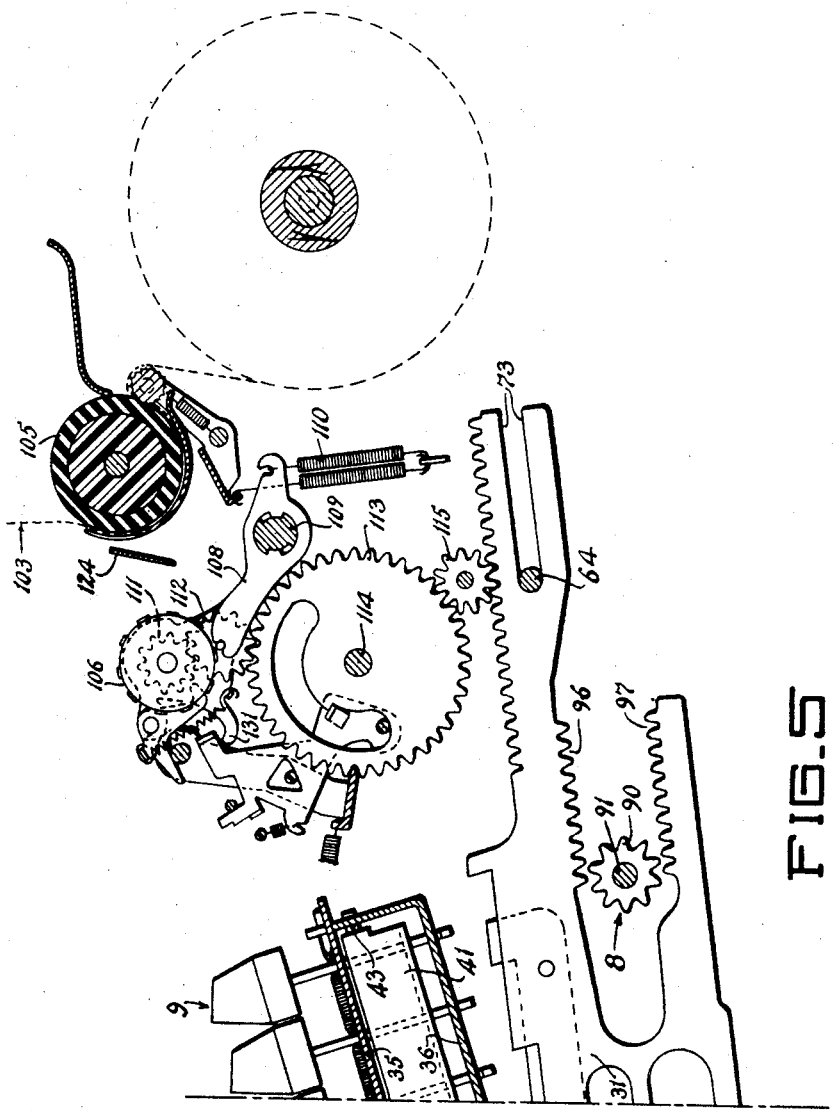
Fig. 5 is a partial longitudinal sectional view through the machine and is taken along the rear portion of the line 2:5—2:5 of Fig. 1.

Each key, when depressed, is latched in blocking position by a locking bail 41 pivoted at opposite ends thereof on the vertical walls of the key plate 36 by trunnion bearings 42 and 43 (Figs. 2 and 5). For this purpose, each key stem has a cam lobe (not shown) formed thereon which, when the key is depressed, rocks a locking bail 41 laterally against the action of a spring 44 extending between the top of each bail and the bottom of its adjacent bail. As the key reaches the bottom of its stroke the spring 44 returns the bail to a position over the top of the cam lobe, thereby latching the same.

The stems of keys 9 cooperate with respective ones of a series of shoulders 46 formed on the aligned racks 31 to control differential positioning of the latter. The various shoulders 46 are spaced apart distances slightly greater than the distances between the stems so that depression of any key will permit forward movement of the associated rack 31 a number of increments equal to the value of such depressed key.

A zero block 47 extends downwardly from each of the lock bails 41, and when no key in the associated order is depressed, the bail 41 of that row will be spring held in an extreme inwardly rocked position wherein the zero block 47 lies directly in front of one of the shoulders 46 of the aligned rack, thereby preventing a substantial forward movement of this rack during subsequent operation of the machine. However, upon depression of a key, the locking bail will be held outward thereby sufficiently to retain the zero block 47 out of cooperative relation with its associated rack.

*Drive*

The various units of the machine are driven by a rotatable drive shaft 55 (Figs. 6, 7, 8, 13, 15, 16, 18, and 20) from an electric motor (not shown) under control of a cyclically operable clutch generally indicated at 56 (Figs. 8 and 15). The driven side of the clutch is attached to the shaft 55 and the clutch is controlled by a clutch dog 57 pivoted on a frame pin 58 and arranged to effect engagement of the clutch upon counterclockwise movement thereof away from the clutch.

Disengagement of the clutch is effected by rocking the dog 57 clockwise into the position illustrated in Fig. 8.

Means are provided for yieldably transmitting a reciprocating motion to the various drive racks 31 from the shaft 55 during rotation of the latter. Referring to Fig. 7, a pair of juxtaposed complementary drive cams 60 and 61 are keyed on the shaft and cooperate with respective ones of a pair of rollers 62 and 59 mounted on a cam follower 63. The latter is pivoted on a stationary shaft 64 and is connected by a link 65 (see also Fig. 6) to an arm 66 suitably fastened on a rock shaft 67. A similar arm 66a (Fig. 2) is also fastened on the shaft 67 on the opposite side in the machine and both arms are bifurcated to embrace a rack drive shaft 68 mounted for fore and art movement in elongated slots, one of which is shown at 70 formed in frame plates 71.

Referring to Fig. 2, each of the various drive racks 31 is supported at its forward end by the drive shaft 68, the latter being slidably embraced by a slot 72 in the rack. The rear end of each of the racks is provided with an elongated slot 73 (Fig. 5) which embraces the stationary shaft 64.

The slot 72 in each of the racks terminates at its closed end in opposed notches 74 normally engaged by rollers 75 carried by drive elements 76. The latter are rockably fitted in circumferential grooves formed in the shaft 68 and the adjacent drive elements 76 associated with each rack are spring urged in opposite directions by a tension spring 77 extending between the tails of the two elements to resiliently hold the rollers in the notches, thus forming a yieldable connection between the shaft 68 and the respective drive racks 31.

When, during forward movement of the shaft 68, as occurs during the first half of a machine cycle, each of the drive racks 31 is arrested due to striking against a depressed key stem or the associated zero block 47 or engagement of a "nines" stop shoulder 80 against a locking bail 81, the rollers 75 will ride out of the associated notches 74, thereby breaking the connection between the shaft 68 and the rack 31. The rollers will thereafter merely ride along the edges of the slot 72.

The racks 31 are returned to their zero or home positions during the latter half of each machine cycle by the cams 60 and 61, and means are provided for locking all of the various racks 31 in their zero positions at the completion of the machine cycle, as well as in their forwardly advanced positions during the midpoint or printing phase of a machine cycle. For this purpose, a series of notches 82 (Figs. 2 and 6) are formed on the under forward edge of each of the racks 31 and are spaced apart distances equal to the different increments of movement of the racks. The various notches are adapted to be engaged by the locking bail 81 after both the forward and return movements of the racks. For this purpose, the bail 81 is pivoted at opposite ends on frame pins 83 and is provided at its right hand end with an arm 84 (Fig. 6) connected by a link 85 to a cam follower 86. The latter is pivoted on the stationary shaft 64 and is provided with rollers 78 and 79 which cooperate with respective ones of a pair of complementary drive cams 88 and 89 keyed in juxtaposition with each other on the drive shaft 55.

Accumulator

The details of the accumulator unit are not pertinent to the present invention and thus they are omitted herein. However, reference may be had to said Drake Patent No. 2,472,696 for the details of an accumulator applicable to the machine.

The accumulator unit comprises a series of denominationally arranged ten tooth accumulator gears 90 (Figs. 5 and 15) independently and rotatably mounted on an accumulator shaft 91.

The shaft 91 and a second shaft 92, also forming part of the accumulator, are guided at opposite ends thereof in vertical slots 93 and 94, respectively, (Fig. 16) formed in plates, one of which is shown at 95, suitably secured, in a manner not shown, to the machine frame plates.

Means are provided for raising and lowering the accumulator unit for the purpose of engaging the various accumulator gears 90 with either upper rack gear sections 96 or lower rack gear sections 97 formed on the drive racks 31. That is, during an additive operation, the accumulator is raised to mesh the accumulator gears 90 with the upper rack sections 96 so that during forward movement of the racks the gears will be rotated in a counterclockwise direction, while during a subtractive operation the accumulator is lowered to mesh the gears 90 with the lower rack gear sections 97 to effect a clockwise rotation of the gears during forward movement of the racks.

For the purpose of raising and lowering the accumulator unit in accordance with the type of operation to be performed, a box cam, one of which is shown at 98 (Fig. 16), is provided at each side of the machine and is pivoted on a frame stud 100. Each cam is provided with a cam slot 101 which embraces a roller 102 mounted on the respective end of the accumulator shaft 91. Clockwise rocking movement of the cam 98 from its illustrated neutral position will raise the accumulator into its additive position, whereas counterclockwise rocking of the cam will lower the accumulator to its subtractive position, as will become more fully apparent hereinafter.

Printer

The various values registered on the racks 31 during either item entry or totaling operations are printed on the paper tape 103 (Figs. 5 and 14) which is fed around a rotatable platen 105 to a printing station where the values are printed thereon.

The printer comprises a series of numeral printing wheels 106, one entrained with each drive rack 31. Each printing wheel 106 is rotatably mounted on an individual lever 108 which is loosely keyed on a printer control shaft 109 and is spring urged clockwise toward the platen 105 by an individual tension spring 110. A gear 111 fixed to each printing dial meshes with an associated gear 112 also rotatable mounted on each lever 108. Except during printing operations, the levers 108 are held by shaft 109 in their positions illustrated in Fig. 5, wherein the gears 112 mesh with idler gears 113 independently and rotatably mounted on a fixed shaft 114. The latter idlers are continuously entrained with respective ones of the drive racks 31 through pinion assemblies, one of which is shown at 115.

The printer control shaft 109 is controlled by a printer cam 116 (Fig. 13) keyed on the aforementioned drive shaft 55. The cam 116 engages a roller 117 mounted on a cam follower 118 which is fulcrumed on the stationary shaft 64 and is provided with a camming surface 120 engaged by roller 121 on an arm 122 fixed to the shaft 109. A tension spring 123, along with the various springs 110, holds the cam follower 118 in engagement with the cam 116. However, during the printing phase which occurs at approximately mid cycle, and after the racks have registered the printing wheels 106, the cam 116 allows the shaft 109 to rock clockwise, thereby allowing all levers 108 which are otherwise allowed to do so, to force the printing wheels 106 into contact with printing ribbon 124 and into contact with the paper tape 103 as it passes over the platen 105.

Clutch controls

Operation of the machine and engagement of the clutch 56 (Figs. 8 and 15) is effected by depressing any of the various machine control bars and keys as well as by rocking of the multiply-divide handle 21 fore or aft of the machine. Normally, the machine will continue to cycle as long as the control bar, key or handle is held in actuated position. However, upon an over-draft of the accumulator in one direction or another, the clutch will be automatically disengaged, even though the clutch control bar or handle be held in actuated position.

Referring in particular to Fig. 8, the aforementioned clutch control dog 57 is normally urged clockwise toward its illustrated clutch disengaging position by a tension spring 145. The clutch dog is normally coupled to a clutch control bar 146 by a hook member 147 pivoted to the control bar at 148. The hook member has a notch normally held in embracement with a pin 150 on the clutch dog by a tension spring 151 extending between the hook and a frame pin 152.

The clutch control bar 146 is supported for longitudinal movement by a pair of frame pins 153 and 154 embraced by elongated slots 155 in the bar.

The control bar 146 has four inclined cam slots 156 formed therein, each of which underlies a pin 157 carried on a lever 158, pivoted on a frame pin 159, and urged upwardly by a spring 160 extending from a suitable frame pin (not shown) and the pin 157. The pins 157 underlie the minus, nonadd, sub-total and total keys 13, 14, 19, and 17, respectively. Therefore depression of any of these bars will likewise depress its associated pin 157 to cam the control bar 146 forwardly against the action of spring 151, and thus, through the hook 147, rock the clutch control dog 57 counterclockwise to cause engagement of the clutch 56.

Provision is also made to effect engagement of the clutch upon depression of the add bar 10. As shown in Fig. 2, the add bar 10 is connected by a pin and slot connection 38 to a bail 45 which extends across the machine and is pivoted at 48 on stationary frame pins. The bail carries a roller 161 (Fig. 8) the latter co-acting with a camming surface 162 formed on the forward end of the clutch control bar 146 so as to cam the latter bar forwardly upon depression of the add bar.

For the purpose of automatically causing disengagement of the clutch 56 upon an overdraft of the accumulator in either direction, the accumulator gear 90a (Fig. 15) located in the highest denominational order of the machine, is provided with a laterally extending ear 170 which cooperates with a pair of by-pass pawls 171 and 172. The latter are pivotally supported at 173 and 174, respectively, on a plate 175 which is freely pivoted on the lower accumulator shaft 92. A tension spring 176 extends between the tails of pawls 171 and 172 to normally hold the same in contact with a hub 177 of the plate 175.

The plate 175 is yieldably held in either of two rocked positions by a detent 178 pivoted at 180 on an associated accumulator brace plate 181. A pin 182 on the lower end of the detent is held in engagement with one or the other of two detenting notches in the plate 175 by a tension spring 183 extending between the shaft 92 and pin 182.

The plate 175 is connected by a link 184 to the lower end of a lever 185. The later is fulcrumed on the aforementioned pin 58 and is provided with a camming stud 186 which co-acts with a camming surface 187 formed on the coupling hook 147.

The accumulator plate 175 is illustrated in the normal positive condition of the accumulator with the gear 90a registering zero. It will be recalled that in additive operations the accumulator gears are rotated counterclockwise, whereas in subtractive operations the gears are rotated clockwise. Thus, as amounts are added into the accumulator and the capacity of the latter is exceeded, resulting in counterclockwise rotation of the highermost denominational accumulator gear 90a, the ear 170 carried thereby will merely wipe over the top edge of the pawl 171, rocking this pawl clockwise against the action of its spring 176 without affecting the position of the plate 175 and entrained linkage. However, in the event that amounts subtracted from the accumulator exceed positive amounts registered therein, the accumulator gear 90a will be rotated clockwise beyond its position shown in Fig. 15, causing the ear 170 to strike the rear edge of pawl 171, rocking the plate 175 counterclockwise about shaft 92 to its alternate position. In doing so, the link 184 will be drawn forward, rocking the lever 185 and causing its stud 186 to cam the hook 147 upward, thus releasing the clutch dog 57 so that it may return under the action of its spring 145 to clutch disengaging condition, even though the clutch control bar or handle is held in actuating position. The lever 185 will now have been positioned to locate its pin 186 beyond the camming surface 187 and in the dot-dash position 186a. Thus, the hook member may be again spring moved into coupled relation with the clutch dog 57 as soon as the control bar or handle is returned from actuating position so as to permit return of the clutch bar to initial position.

In the event that the accumulator is overdrafted from its above described negative condition to its normal positive condition, the accumulator gear 90a is rotated counterclockwise, causing the ear 170 to strike the forward end of by-pass pawl 172. This will rock the plate 175 back to its position shown in Fig. 15 so as to return the pin 186 from its dotted line position 186a to its full line position. Therefore, the pin 186 will again cam the hook member 147 upward to release the clutch dog 57 to effect clutch disengagement.

Means are provided for returning the plate 175, etc., to their normal illustrated positions as an incident to a total taking operation, and in the event the accumulator has previously been set in a negative overdrafted condition. For this purpose, the pin 157 (Fig. 15) associated with the total key 17 is embraced by a bifurcated extension 196 of a bail 197 pivoted on frame pins, one of which is shown at 198, and having a portion thereof located directly in front of an ear 200 extending from an indicator lever 190 coupled at 188 to the arm 185. Thus, depression of the total bar will rock the bail 197 counterclockwise and directly return the lever 190 from its overdraft indicating position 190a, and therewith return the remaining entrained linkage, including plate 175, to its position shown in Fig. 15.

*Accumulator controls*

As mentioned heretofore, the accumulator is raised or lowered from its neutral position shown in Fig. 5 into mesh with upper or lower rack sections 96 and 97 of the various drive racks 31, depending on whether additive or subtractive and totaling operations are to be made. For this purpose, mechanism is provided under control of the multiply-divide handle 21 and the various control bars, with the exception of the keys 20, 23 and 28, to position the accumulator. The box cams, one of which is shown at 98 (Fig. 16) each carries two pins 203 and 204 located on opposite sides of the pivot pin 100. These pins are adapted to be selectively engaged by a hook member 205 pivotally connected at its rear end at 202 to a three-arm cam follower 206 pivoted on the shaft 64. The cam follower is urged counterclockwise by a tension spring 207 to press a roller 208 on a depending arm thereof against a cam 209 keyed on the drive shaft 55.

The cam 209 has a high portion extending over substantially half of its periphery whereby to rock the cam follower 206 and thereby normally position the hook member rearwardly during approximately the first half of a machine cycle.

Normally, when the machine is at rest, and during additive operations, such as addition and multiplication, the hook member 205 is raised by a tension spring 205a into its position shown, wherein a slot in the upper edge thereof engages the pin 203 so that as the hook member is moved rearwardly, it will rock the box cam 98 clockwise, to raise the accumulator into its additive position. Such action will occur prior to forward movement of the racks.

Means are provided under control of certain of the control bars and the multiply-divide handle 21 (when rocked forwardly) for locating the hook member 205 in lowermost position to effect subtractive entries into the accumulator. For this purpose, a control bar 50 is provided, being supported for longitudinal movement by a pair of parallel links 210 suspended from frame pins 211. The bar 50 is provided with four inclined camming surfaces 212 underlying the aforementioned depressible pins 157 associated with the control bars 13, 14, 17, and 19 (Figs. 1 and 8).

The bar 50 has a pin and slot connection 213 with a bell crank 214 which is fulcrumed on a frame pin 215 and is provided with roller 216 embraced by an elongated slot formed in the hook member 205. The camming surfaces 212 on bar 50 are so arranged that upon depression of the minus bar 13, total bar 17, or the subtotal bar 19, the control bar will be moved forwardly to its fullest extent which will be effective through the bell crank 214 to lower the hook member 205 into embracing engagement with the pin 204 so that subsequent rearward movement of the hook member will rock the box cam 98 counterclockwise and thereby lower the accumulator into its subtractive position relative to the racks.

The contour of the camming surface 212 underlying pin 157 associated with the non-add bar 14 is such that depression of this bar will move the control bar 50 only half way through its forward stroke so that the hook member 205 will be located in an intermediate position wherein it will not engage either of the pins 203 and 204.

During adding or subtracting operations, and after the high portion of the cam 209 has passed the roller 208, the spring 207 will become effective to return the hook 205 and consequently the cam 98 and the accumulator to their neutral positions before return of the racks from their forwardly advanced positions.

*Multiply-divide mechanism*

Referring to Figs. 2, 4, 24, 25, and 27, the multiply-divide mechanism comprises a series of multiplicand-divisor stop slides 32 spaced apart the same distances as the racks 31 and slidably carried on a flexible belt 236. The belt, which is constructed of thin flexible metal, such as beryllium copper, is wrapped around a pair of flanged pulleys 237 and 238 located at opposite sides of the machine, whereby to carry the various slides into different denominational relationships with the racks.

The belt 236 is normally positioned to maintain the stop slides 32 out of alignment with the various racks, i. e., between adjacent racks, but is moveable laterally of the machine by the handle 21 into any of various selected positions where the slides are located in the paths of movement of adjacent racks. As will appear hereinafter, the slides may be set longitudinally by certain of the racks so as to register the multiplicand or divisor in multiplication or division calculations, respectively. On the other hand, the slides, having a value registered thereon, are utilized to differentially arrest the racks in corresponding digital positions during multiplication and division calculations. Thus, by proper manipulation of the handle 21 in multiplaction problems, the multiplicand is successively entered by repeated additions into different groups of the racks in accordance with the multiplier value. In division the slides, having been set to register the divisor, enter this factor by repeated subtraction successively in the different groups of racks, the same being subtracted from each group until an over-draft occurs, at which time the factor is added back once and then subtracted repeatedly from the next succeeding lower order group of racks, etc.

As shown in Fig. 4, each stop slide 32 has an elongated slot 240 therein embracing two guide pins 241 and 242 fastened to the belt 236. A tension spring 243 is extended between the rearmost pin 242 and a pin 244 fastened to the forward end of the slide, whereby to normally hold the slide in its rearmost illustrated position and to return the same to this position from an advanced position when otherwise allowed to do so. In such rearmost position the rearmost end of each slide 32 will be spaced a slight amount forwardly of the forward end of the associated rack 31, leaving a slight gap as indicated at 245 (Fig. 2), permitting the various slides to be moved laterally by the belt 236 past the various racks 31 without interference.

The belt 236 is carried around the flanged portions 246 of the pulleys 237 and 238, and a tension spring 247 (Fig. 24) is connected between the ends thereof to form an endless belt arrangement.

The pulleys 237 and 238 are each rotatably mounted on axle pins 248 extending between the side flanges 250 and 251 of U-shaped bracket 252. The latter is secured by screws 253 (Fig. 24) to side frame plates 254 and 255 which support the multiply-divide mechanism.

The mulitply-divide handle 21 is mounted on a pin 256 suitably secured to a generally U-shaped carrier 257. The latter rotatably supports a set of four rollers 258 located in rolling engagement with a square shaft 260, two of the rollers engaging the upper side of the shaft and the other two engaging the lower side. The rollers permit lateral movement of the handle along the shaft but cause the shaft to rock with the handle in any of the different positions thereof. The latter shaft is provided with bushings 261 and 262 rotatably mounted in bearings formed in the side plates 254 and 255, thereby permitting a rocking movement of the shaft 260 by the handle 21.

Means are provided to couple the belt 236 to the handle 21 whereby to carry the former into different denominational positions relative to the racks 31. For this purpose, a connector member 263 (Figs. 2, 24 and 27) in the form of a yoke is provided, having a pair of spaced ears 264 pivoted on a pin 265 which is carried by similar ears extended outwardly from the carrier 257. A depending finger 266 on the connector 263 extends downwardly into an elongated slot 267 (Fig. 4) formed in the belt 236. The yoke portion of the connector 263 fits into a groove 268 of a four-toothed counter actuator gear 270 which is slidably keyed on a counter actuator shaft 271. Thus, as the handle 21 is moved along the shaft 260 it will, through the connector 263, carry the belt 236 and actuator 270 therewith to align the stop slides 32 in co-operative relation with different ones of the racks 31 and to align the actuator 270 into cooperative relation with different ones of a series of toothed dials 272 comprising the multiplier-quotient counter 22.

A top plate 273 extending over the multiply-divide mechanism is provided with depending ears, one of which is indicated at 274 (Fig. 26) suitably secured, as by screws 275, to the side frame plates 254 and 255. The top plate, besides bracing the frame 254 and 255, is provided with an elongated slot 276 through which the pin 256 of handle 21 extends. This slot is provided with a series of opposed notches 277 located in the different denominational orders of the machine. Such notches are engageable by a roller 278 rotatably mounted on the lower end of the handle pin 256 to permit fore or aft rocking or of the handle 21 only when the latter is located in a denominational position to align the stop slides 32 with associated ones of the racks 31 and to align the actuator 270 with the teeth of an aligned one of the dials 272.

Figure 26:
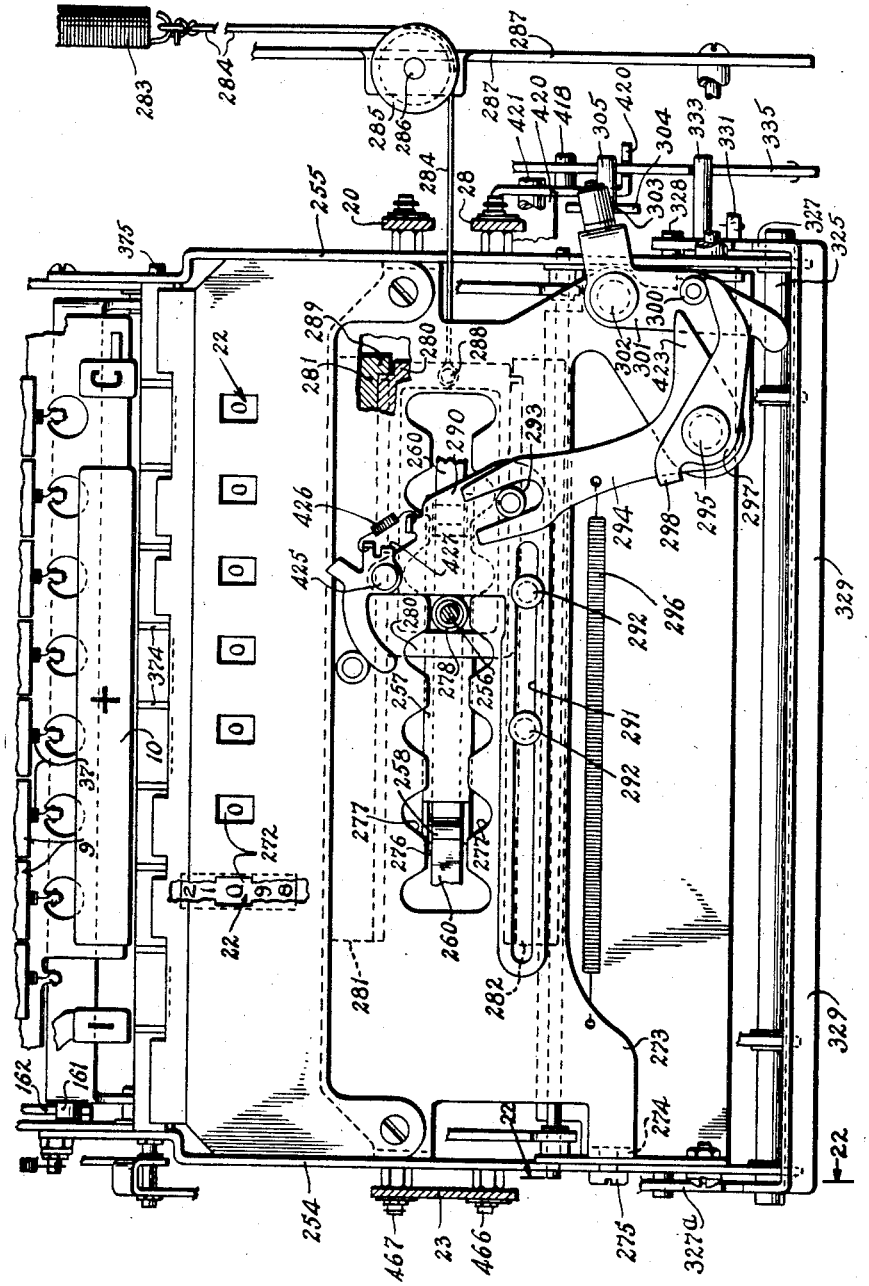
Fig. 26 is a plan view of the multiply-divide control mechanism and is taken in the direction of the arrow 26 in Fig. 2 with the cover removed.

Means are provided for normally and yieldably urging the handle 21 toward the right of the machine into its lateral position shown in Figs. 1 and 26. For this purpose, an apertured rectangular plate 280 is slidably mounted on the under surface of the top plate 273 by two guide pieces 281 and 282 (see also Fig. 2) secured to the under side of the top plate. The roller 278 extends through the plate 280 and the latter is urged to the right by a tension spring 283 connected at one end thereof to a flexible cable 284 and attached at its opposite end (not shown) to a suitable portion of the machine frame.

The cable 284 is reeved over a pulley 285 pivoted on a pin 286 carried by an outboard frame plate 287 forming part of the machine framework. The cable 284 is attached at 288 to the plate 280.

Figure 24:
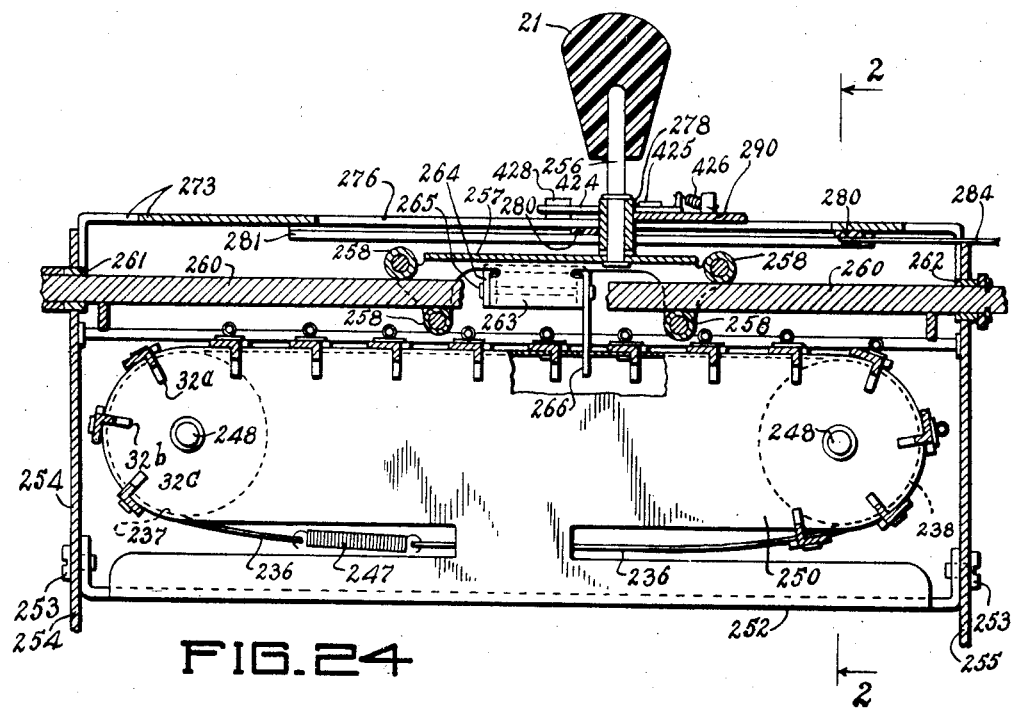
Fig. 24 is a sectional view through the multiply-divide control mechanism and is taken substantially along the lines 24—24 of Fig. 2.
Figure 25:
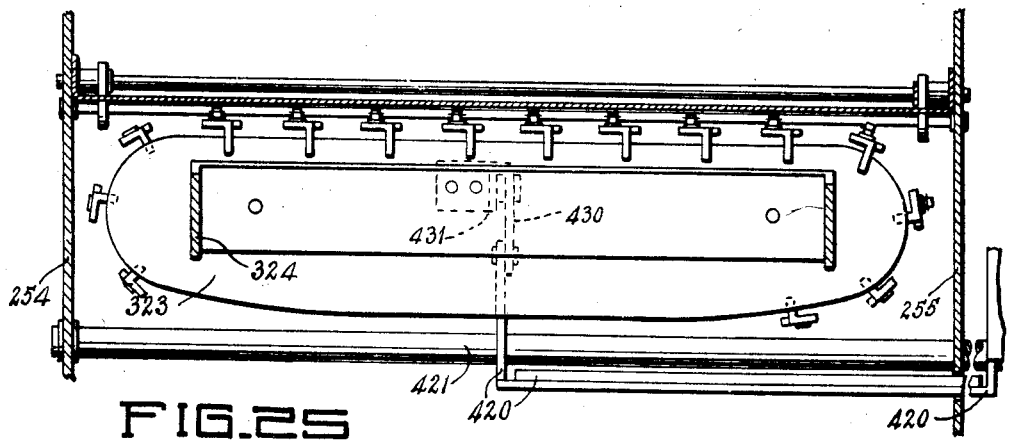
Fig. 25 is a view similar to Fig. 24 but taken forwardly thereof, substantially along the lines 25—25 of Fig. 2.

For the purpose of normally limiting the handle 21 in the position shown in Figs. 1 and 24 against the action of spring 283, and in a location wherein the stop slides 32 are located out of alignment with the racks 31, tabs 289 (Fig. 26) are formed on the right hand ends of the guide pieces 281 and 282, the tabs lying in the path of the plate 280 to arrest the same.

A return slide 290 is provided to return the handle 21 leftwardly, as viewed in Figs. 1, 24, and 26, into its illustrated position in the event it has been manually moved to the right of such position. The latter has an elongated slot 291 slidable along guide pins 292 fixed to the top plate 273. The slide 290 is engageable by the roller 278 of handle 21 and is connected through a pin and slot coupling 293 to a bell crank 294 pivoted on a pin 295 fixed to an extension of the plate 273. A spring 296 of approximately the same strength as spring 283 is tensioned between a part of the plate 273 and bell crank 294, thereby yieldably maintaining the latter, along with slide 290, in the position shown, against the roller 278 of handle 21, wherein these parts are limited by a lever 297, also pivoted on the pin 295, and provided with an ear 298 engageable by the bell crank 294. The opposite arm of lever 297 is normally limited against a roller 300 carried by a bell crank 301 fulcrumed on a stud 302 which is fixed on the top plate 273. The bell crank 301 is connected through a pin and slot connection 303 (see also Fig. 20) to an actuating lever 304. The latter is pivoted at 305 and is normally held in its position shown by a tension spring 306 so as to cause the bell crank 301 to limit the parts 290, 294 and 297 in their positions shown in Fig. 26 by reason of a pin and slot connection 49 hereinafter described. However, the handle 21 may be moved to the right into any of the three right-hand denominational positions (aligned with the three right-hand opposed notches 277) if desired, by forcing the same against the slide 290 to overcome the spring 296.

As will be described hereinafter, means are provided for actuating the lever 304 during multiplicand and divisor entering operations in order to cause the bell crank 301 to force the slide 290 to the left. This will move the handle 21 to the left until aligned with the next denominational order or set of opposed notches 277 to the left.

Means are provided whereby rocking of the handle 21 fore or aft of its neutral position, illustrated in full lines in Fig. 2, into its alternate positions, shown by the dotted lines 21a and 21b, will cause engagement of the clutch and appropriate positioning of the accumulator to add or subtract amounts thereinto.

Referring particularly to Figs. 9 to 12, inclusive, the aforementioned bar 260 rockable by the handle 21 is fastened, at the left-hand side of the machine, to an arm 310 which is connected through a yieldable link 311 to an actuating arm 312 pivoted on a frame pin 313. The link 311 is normally held to the length shown in Fig. 9 but may be extended or contracted beyond this position.

Rearward (clockwise as viewed in Fig. 2) rocking of the handle 21 to its dotted line position 21b to effect additive operations of the machine will likewise rock the arm 310 from its neutral position shown in Fig. 9 to that shown in Fig. 11, thereby transmitting through the link 311 a counterclockwise rocking movement to the arm 312, causing an ear 318 thereon to engage the foot 319 on the aforementioned clutch control bar 146, causing the latter to move forwardly to effect engagement of the clutch.

Since, as mentioned heretofore, the accumulator is normally conditioned for an add operation, the accumulator positioning control bar 50 (Fig. 16) will remain unaffected.

On the other hand, rocking of the handle forwardly (counterclockwise as viewed in Fig. 2) to its dotted line position 21a will correspondingly rock the arm 310 from its neutral position to that shown in Fig. 10, which, through the link 311, will force the arm 312 clockwise, causing the upper tip thereof to engage an ear 320 on the lever 153 (see also Fig. 8) associated with the minus bar 13. Depression of the latter lever will, through the accumulator positioning control bar 50 set the hook member 205 (Fig. 16) to lower the accumulator into subtractive relation with the racks just prior to engagement of the clutch.

Means are also provided for locking the handle 21 in a rocked position throughout approximately that first half of a machine cycle initiated by the handle, and in which the accumulator is being digitized for adding or subtracting. Referring to Fig. 22, the cam member 327a has a camming surface 253 which coacts with a roller 354 on a bail 355. The later is pivoted on a frame stud 356 and is provided with a pair of projections 357 forming a locating notch 359. The bail 355 is normally held in its position shown by a spring 358, but during the aforementioned half of a machine cycle the link 335 will rock the cam member 327a and the latter will cam the bail 355, forcing the notch 359 to engage one or the other of two pins 360 and 361 carried by the aforementioned arm 310, depending upon the rocked position of the handle 21.

In adding or other machine operations in which the handle is not used, it is locked in its neutral position by the same bail 355, in which case the projections 357 are positioned between the pins 360 and 361.

Describing now the means for holding the stop slides 32 in proper rack arresting positions during multiplication and division calculations, the majority of such slides are provided with sets of combing teeth 322 (Figs. 2, 4 and 27) engageable by a locking bail 323. The latter is carried by arms 324 pivotally mounted on a pivot shaft 325 which is carried in elongated slots 326 formed in the side frames 254 and 255 as shown in Figs. 2 and 20.

The locking bail 323 is normally held in its illustrated locking position whereby to hold the various stop slides in the various digital positions in which they may be set, except during multiplicand and divisor entry operations, as will appear hereinafter. However, the locking bail is normally located in a forward position, due to shaft 325 resting in the forward ends of the slots 326 whereby to provide the gap 245 (Fig. 2) mentioned heretofore, and is moved rearward by the amount of such gap during multiplication and division operations. Thus, in orders where the slides 325 register zero, such slides will substantially contact the forward ends of the associated racks 31. Toward this end, the pivot shaft 325 is embraced at opposite ends thereof by cam slots formed in cam members 327 and 327a (Figs. 20 and 22). The latter are connected by a bail bar 329 and are pivoted on frame pins 328 and 329. The bail bar and cam members are normally urged in a clockwise direction into their illustrated positions by a spring 330 tensioned between a pin 331 carried by the cam 327 and a frame pin 332, whereby to hold the locking bail 323 in its normal forward position.

A pin 333 on the cam member 327 is normally engaged by a slot 334 formed on an actuator link 335. The latter is connected at 336 to a cam follower 337 pivoted on the aforementioned shaft 64 and is provided with rollers 340 and 341 which engage diametrically opposite sides of a cam 342 which is keyed on the drive shaft 55.

A spring 343 is tensioned between the frame pin 332 and link 335 to normally hold the slot 334 in engagement with the pin 333. Thus, during multiplication and division operations, the link 335 will be drawn rearwardly at the start of each cycle, rocking the cam members 327 and 327a counterclockwise to force the locking bail 323 rearwardly by an amount equal to the gap 245 (Fig. 2). At approximately mid-cycle the cam 342 again returns the parts to their original positions.

Since in multiplication and division calculations it is desirable to control the extent of movement of the racks 31 solely by the stop slides 32, means are provided for automatically releasing any amount keys which may have possibly been depressed prior to such multiplication and division calculations and incidentally to hold the aforementioned key lock bails 41 (Figs. 2 and 5) in outwardly rocked positions against the action of their springs 44 so that the racks may freely move forward without interference by the zero blocks 47. For this purpose the arm 310 (Fig. 9) is formed into an inverted V shape and engages a roller 780 carried on a bell crank 781 fulcrumed on the aforementioned frame pin 313. Another arm of the bell crank 781 is connected through a link 782 (see also Fig. 16) to the lower end of a vertical link 783. The upper end of the latter link is connected to a lever 784 pivoted upon a frame pin 53, the forward end of the lever overlying a key release lever 785. The lever 785 forms part of the key release mechanism (not shown) which, upon depression of the lever 785 acts to rock all key lock bails 41 outwardly, removing the zero blocks 47 from positions blocking the racks 31.

Normally, a spring 786 tensioned between the link 782 and a frame pin holds the link 782 to the left, thereby maintaining the link 783 in a position wherein a shoulder 787 thereof lies outside the path of movement of a pin 788 carried by the forementioned bell crank 225. However, upon rocking of the handle 21 from its neutral position into its add or subtract controlling position, the arm 310 will cam the bell crank 781 counterclockwise and thus position the shoulder 787 over the pin 788. Accordingly, as the lever 225 is rocked at the start of the machine cycle initiated by the handle 21, the link 783 will be forced upwardly to rock the lever 784 and thus cause release of any depressed amount key and release of all zero blocks 47 from blocking relation with their respective racks 31.

*Multiplier-quotient counter*

The multiplier quotient counter 22 (Figs. 1, 2, 3, 26 and 27) comprises a series of denominationally arranged dials 272 arranged to be selectively actuated by the actuator 270, according to the position of the handle 21 laterally of the machine, as was described heretofore. The various dials 272 are independently and rotatably mounted on a counter shaft 362 which extends through vertical slots (one of which is shown at 362 in Fig. 20), in the side frames. The shaft 362 is normally held in its illustrated raised position by a toggle arrangement located at opposite sides of the machine. One such toggle arrangement is indicated in Fig. 23 and comprises an arm 369 pivoted at the upper end thereof on the shaft 362 and pivotally connected at 364 to one arm of a bail 365 which, in turn, is fulcrumed on the shaft 313. A pin 367 on the bail 365 is normally engaged by a shoulder formed on a link 368, whereby to hold the bail against a frame pin 370.

Each dial 272 has fast thereto a ten-toothed gear 371 adapted to be meshed by a rack gear extension 373 formed integral with an aligned one of the racks 31. A detent 374 is located in alignment with each gear 371 and is pivoted on a cross shaft 375, a tension spring 376 yieldably maintaining the detent in engagement between two of the teeth of gear 371 so as to align a numeral on the dial in registry with a respective sight opening 377.

As shown particularly in Figs. 3 and 27 each of the dials 272 is provided with ten laterally extending teeth 378, one of which teeth 378a extends a greater distance than the rest and is aligned with a zero stop ear 380 formed on a stationary frame brace member 381. Normally, however, the counter dials are located above the zero stops 380 and thus are not affected thereby.

*Counter-actuator mechanism*

The counter actuator 270 (Figs. 2 and 27) is rotated one-quarter revolution during each cycle while the machine is performing multiplication or division, whereby to advance an aligned dial 272 one increment in an appropriate direction. That is, during multiplication operations and when the handle 21 is rocked rearwardly toward the rear of the machine to effect additive entries, the actuator is rotated clockwise, causing the dial to progress from one numeral increment to the next higher numeral increment. When the handle is rocked forwardly to effect subtractive operations, however, such as would occur in negative multiplication, or in making corrections, the actuator is rotated counterclockwise to retrogress its respective dial.

On the other hand, during division operations, and when the handle 21 is rocked forwardly to effect subtractive entries, the actuator is rotated clockwise to progress its dial, whereas, when the handle is rocked rearwardly during such division operations, the actuator is rotated counterclockwise to retrogress the dial.

This reversal of the direction of rotation of the counter dials during multiplication and division problems is predetermined by the depression of one or the other of the two factor entry keys 20 and 28 as an incident to entry of multiplicand or divisor factors, as will appear hereinafter.

The means for intermittently rotating shaft 271 and actuator 270 comprises a link 384 (Figs. 17, 18, and 19) arranged to be reciprocated in one direction or the other from its neutral illustrated position.

This is accomplished by a pair of juxtaposed cams 385 and 386 keyed on the drive shaft 55. The latter cams operate respective ones of a pair of cam followers 387 and 388 pivotally supported on the aforementioned cross shaft 64. Tension springs 390 and 391 maintain the respective cam followers 387 and 388 in contact with their cams to locate pins 391 and 392, respectively, thereon in registry with notches 393 and 394. The former notch is located in an extension 395 of the link 384, whereas the notch 394 is formed in the link proper.

The link 384 is provided with an elongated slot 396 at its forward end which embraces a stud 397 carried on an arm 398 fastened to the right hand end of the handle controlled shaft 260.

A pair of actuating pawls 400 and 401 are pivotally mounted at their remote ends on the link 384 adjacent the forward end thereof, and a spring 402 is tensioned between the pawls to normally retain the same in their relative positions shown in Figs. 17 and 19. The latter pawls are adapted to co-act with four equally spaced pins 403 mounted on a pin wheel or ratchet wheel 404 attached to the right hand end of the actuator shaft 271.

A centralizer 405 is provided to normally locate the pin wheel in its position illustrated in Fig. 17. The centralizer is pivoted on a frame pin 406 and is urged downwardly by a tension spring 407 to maintain a roller 408, carried thereby, in engagement with two of the pins 403.

In the normal arrangement of the parts as shown in Fig. 17, reciprocation of the link 384 in either direction from its illustrated position, in response to depression of one of the various machine control bars, will result in one or the other of the actuating pawls 400 and 401 passing between two of the pins 403 without engaging the same. However, when the handle 21 is rocked forwardly to effect subtractive entries, the lever 398 will lower the forward end of the link 384 to its position shown in full lines in Fig. 19, thereby aligning the actuating pawls 400 and 401 with the two lower pins 403. Consequently, reciprocation of the link in one direction or the other, as will appear hereinafter, will cause an appropriate one of the actuator pawls to advance the pin wheel 404 and consequently the actuator 270 through an angle of ninety degrees in one direction or the other.

On the other hand, rocking of handle 21 rearwardly to effect additive entries will result in positioning the link 384 above its normal position shown in Fig. 17, wherein the pawls 400 and 401 will assume their dotted line positions 400a and 401a (Fig. 19), in line with the upper two pins 403. Thus, reciprocation of the link 384 will result in rotation of the pin wheel 404 in a direction opposite to that which would have resulted if the link 384 were in its lowermost position.

*Multiplicand entry controls*

The multiplicand entry key 20 (Figs. 1, 17, 20, and 21) is effective, upon depression, to cause entry of a multiplicand factor from the amount keys 9 into the stop slides 32. The stem of key 20 is provided with elongated slots 411 and 412 guided over frame pins 413 and 414, respectively. A spring 415 tensioned between an ear 416 on the lower end of the key stem and the frame pin 413 normally holds the key in its illustrated raised position.

Means are provided which are responsive to depression of the key 20 for laterally setting handle 21 and consequently the flexible belt 236 and slides 32 one-half denominational order to the left of that shown in Figs. 1, 26, and 27, whereby to align the slides 32 with the racks 31 so that the racks may be rendered effective to set the slides. For this purpose, the ear 416 of key 20 overlies the aforementioned link 335, and upon depression of the key 20 the link 335 is lowered, moving a notch 417 therein into embracement with a pin 418 extending from a bail 420. The latter is pivoted on a frame pin 421 and is coupled, as aforementioned, through the pin and slot connection 49 to the lever 304, and is provided with a lug 422 which is limited in counterclockwise movement against the pivot pin 305. In the ensuing machine cycle initiated by key 20, the link 335 will be drawn rearwardly, rocking the bail 420 clockwise and consequently lever 304 counterclockwise. The latter lever 304, through its connection 303 to the lever 301 (see Figs. 20 and 26), will cause roller 300 to engage a foot 423 of the bell crank 294, rocking the same counterclockwise a slight amount, thereby shifting the slide 290 leftward to locate the handle in its next denominational position to the left.

The rock bail 323 (Figs. 2, 25, and 27) must be removed from locking engagement with the slides 32 during setting of the latter by the racks 31 in multiplicand entry operations. For this purpose, the bail 420 (Figs. 2 and 20) is connected through a link 430 to an extension 431 of the lock bail 323. Consequently, as the bail 420 is rocked clockwise by the link 335 at the start of a cycle, the lock bail 323 will be rocked downward about its pivot shaft 325 sufficient to clear the combing teeth 322 of the various slides 32.

The multiplicand entry key 20 is effective to condition the counter actuating mechanism of Figs. 17, 18, and 19 to appropriately drive the actuator 270 (Fig. 2) if such actuating mechanism is not already so conditioned. Figs. 17 and 18 illustrate the counter actuator mechanism in such condition. In this case, the rear end of the link 384 is maintained by a spring 434 in a lowered position wherein the notch 394 embraces the pin 392 of cam follower 388. Thus, during an ensuing multiplying operation, the cam 386 will be effective to drive the link 384 rearwardly from its normal neutral position, causing the pawl 400 to operate one or the other of adjacent pins 403, depending on the rocked position of the handle 21.

However, in case a previous operation was one of division, the rear end of link 384 will be held in an upper position wherein the notch 393 thereof embraces the pin 391 so that operation of the machine will cause the cam 385 and follower 387 to force the link 384 forwardly of its neutral illustrated position, thereby causing the pawl 401 to actuate one or the other of the adjacent pins 403, again depending upon the direction in which the handle 21 is rocked. The link 384 is held as aforementioned, in its elevated position by a two-part lever 435 pivoted on a frame pin 436 and held in a counterclockwise rocked position by a latch 437. The latter is fulcrumed at 438 and urged toward the left in Fig. 17 by a tension spring 440 whereby to latch a shoulder 441 over an ear 442 on the lever 435. Now, when the multiplicand entry key 20 is depressed as an incident to a multiplication calculation, the ear 416 thereof will cam the latch 437 clockwise, releasing the lever 435 to the action of spring 434 so that the link 384 may return to the position shown in Figs. 17 and 18.

The lever 435 is in two parts, 435a and 435b, both pivoted on the pin 436. A spring 439 extends between the part 435a and an extension of part 435b, causing an ear 435c of the latter part to limit against the part 435a and thus normally hold the parts in their relative positions illustrated.

Figure 16:
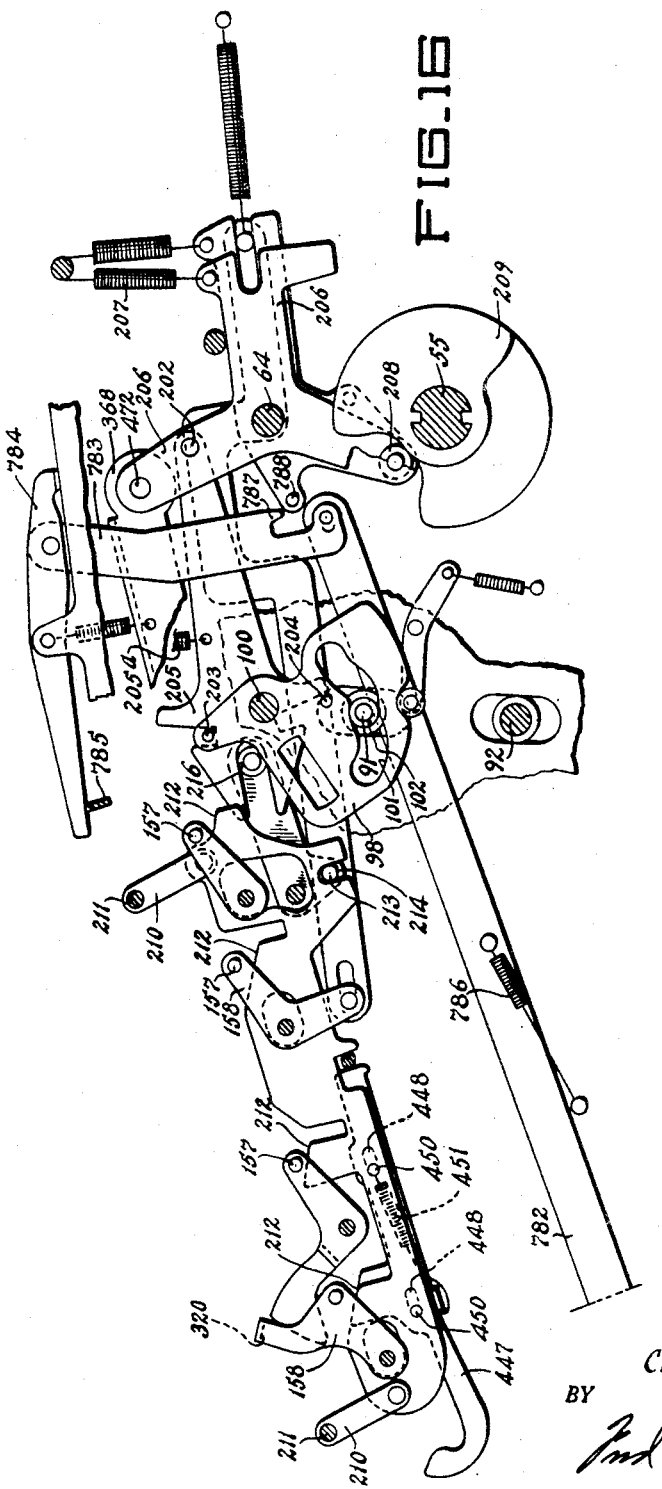
Fig. 16 is a side elevational view, taken along the left-hand side of the machine, illustrating the accumulator positioning controls.

The multiplicand entry key 20 is also effective upon depression to cause setting of the accumulator 8 (Fig. 5) into its neutral or non-add position and to cause engagement of the clutch and operation of the motor. As shown in Fig. 20, the ear 416 of key 20 overlies the forwardly extending arm of a bail 443 pivoted on the aforementioned cross shaft 313. The bail 443 extends across the machine and terminates in an arm 444 (Figs. 9 to 12, inclusive) having a pin 445 thereon, the latter being aligned with a camming surface 446 formed on a forward extension of the slide 447, which, it will be recalled, normally functions as an integral part of the accumulator positioning bar 50 (Fig. 16). The pin 445 also lies directly behind the foot 319 of the clutch control bar 146 (see also Fig. 8). Thus, as the bail 443 is rocked counterclockwise, due to depression of the key 20, the pin 445 will first cam the slide 447 and consequently bar 50 into such a position as to locate the accumulator positioning control hook member 205 in its neutral non-add position. Thereafter, the pin 445 will strike the foot 319 and pick up the clutch control bar 146, causing operation of the motor and engagement of the clutch.

Means are provided to latch the key 20 in a depressed position and to release the same during the mid portion of the ensuing machine cycle. As shown in Fig. 21, a latch 448 is pivoted on the frame pin 414 and is urged clockwise by a tension spring 449 to maintain a latching ear 450 in engagement with the rear edge of the stem of key 20. Upon depression of the key, a latching shoulder 20a thereon passes below the ear 450, thus latching the key depressed. A release link 451 is pivoted at 452 to the lower end of the latch 448 and is urged downwardly by a spring 453 tensioned between the link and the lower tail of the latch 448. Link 451 rides on the top of the aforementioned pin 418 carried by the bail 420. As the latter bail is rocked clockwise by link 335 during a multiplicand entry operation, the pin 418 passes to the rear of a shoulder 454 on the link 451. Now, toward the mid portion of the cycle and when the link 335 is returned forward by cam 342, the pin 418 will pick up the link 451 and carry it forward, thereby rocking the latch 448 clockwise to release the key 20. Immediately after the key 20 is released a projection 51 on the link 451 will engage a frame pin 52, thereby disengaging the shoulder 454 from the pin 418 so that the latter may continue forward.

*Divisor entry controls*

The divisor entry key 28 (Figs. 1, 17, 20, and 21) is effective upon depression to cause entry of a divisor factor from the keyboard into the stop slides 32. The key 28 is mounted for depression upon frame pins 455 and 456 in a manner similar to that of key 20, and a spring 457 is extended between the upper frame pin 455 and the lower end of the stem of key 28 for normally holding the latter in its illustrated raised position. An ear 458 is formed on the lower end of the stem of key 28, and upon depression of the latter, is effective to lower the link 335 into coupling engagement with the pin 418 on the bail 420 in the same manner as if effected by the key 20. Thus, in the ensuing divisor entry operation of the machine, the lever 304 will be rocked to actuate bell crank 294 (Fig. 26) and slide 290 to position the handle 21 in the next higher denominational position in a manner identical to that followed in the aforementioned multiplicand entry operation. Likewise, the slide locking bail 323 (Fig. 2) will be released due to its connection to the bail 420.

It will be noted that the ear 458 of key 28 overlies the forwardly projecting arm of bail 443 (Figs. 9 to 12, inclusive, and 20) whereby depression of the key 28 will cause operation of the motor, engagement of the clutch, and positioning of the accumulator in its neutral or non-add condition in the same manner as is effected by the key 20.

The divisor entry key 28 is effective upon depression to condition the counter actuator mechanism to appropriately drive the counter during succeeding division operations so as to positively count subtractive cycles of operation, and subtractively count additive cycles if such actuating mechanism is not already set in that condition. As shown in Fig. 17, the ear 458 of key 28 overlies the forward end of the aforementioned lever 435 and is thus effective to rock the latter counterclockwise until latched by latch 437. In such condition, the lever 435 will hold the rear end of the link 384 in a raised position wherein the notch 393 thereof will embrace the pin 391 of cam follower 387. Thus, as noted in the preceding section, the cam 385 and follower 387 will cause a reciprocation of the link 384 forwardly of its neutral position during subsequent division cycles of the machine.

In order to hold the key 28 depressed throughout the first portion of a divisor entry operation, the ear 458 thereof is adapted upon depression of this key to move below a latching shoulder 460 (Fig. 21) of the aforementioned latch 448. Thus, the key will be latched in depressed position until release of the latch through the link 451 by bail 420 and actuating link 335.

*Multiplier-quotient counter clearing controls*

The multiplier-quotient key 23 (Figs. 1, 12, and 23) is effective upon depression thereof to cause clearing of the multiplier-quotient counter 22 and recording of the amount registered thereon onto the tape 103 (Figs. 5 and 14).

The key 23 is provided with elongated slots guided for vertical movement on frame pins 466, 467, and 468. A spring 470 tensioned between the pin 467 and a pin 471 on the stem of key 23 normally holds the same in its raised position shown in Fig. 23.

The pin 471 overlies the aforementioned link 368, the rear end of which is pivotally connected at 472 (Fig. 16) to the three-armed lever 206 associated with the accumulator positioning hook member 205. Accordingly, upon depression of the key 23, the forward end of the link 368 will be lowered to cause a slot 473 (Fig. 23) therein to embrace the aforementioned pin 367 extending from the bail 365, which it will be recalled, forms part of the toggle arrangement supporting the counter 22.

The key 23 is further provided with an ear 474 which overlies a tail 475 (Figs. 9 and 12) extending from the arm 444 of the clutch operating bail 443. Thus, as the key 23 is depressed into its position illustrated in Fig. 12, the arm 444 will be forced counterclockwise to cause engagement of the clutch and setting of the accumulator into its non-add condition in the same manner as described in connection with the multiplicand and divisor entry controls.

As the machine cycle ensues under control of the key 23, the link 368, upon moving rearwardly at the start of the cycle, rocks the bail 365, drawing downwardly on the link 363 to lower the counter shaft 362 (Fig. 2) and thus mesh the various dial gears 371 with the rack sections 373 of the various drive racks 31. Also, due to lowering of the counter, the zero stop lugs 380 (Fig. 3) will now be in the path of the long teeth 378a of the counter dials. Accordingly, the racks will drive the dials 272 toward zero registration in a clockwise direction until arrested by the zero stops 380 (Fig. 3). The racks 31 will thus move to digital positions indicative of the value previously registered on the counter dials 272 and this amount will be recorded by the printer mechanism in the usual manner. During the mid portion of the cycle and before the racks are returned to their initial positions, the counter is raised to demesh the dial gears 371 from the rack sections 373.

In order to retain the key 23 in a depressed condition throughout the first half of a machine cycle, a latch 477 is provided, the latter being pivoted on the shaft 260 and urged counterclockwise by a spring 480. The spring normally holds the latch against the forward side of the ear 474 on the stem of the key 23. As the latter is depressed, the latch 477 will move into latching position relative thereto.

A tip member 481 is pivoted at 482 on the link 368 and also has a pin and slot connection 483 with the link permitting the same to be held in the relative position shown in Figure 23 by a tension spring 484 extending between the tip and the link. As the link is first lowered by the key 23, the tip member 481 will rest upon an ear 600 of the latch 477. Thereafter, as the link 368 is drawn rearwardly and later returned, a shoulder 601 thereon will engage the ear 600, rocking the latch 477 to release the key 23. As the link 368 is returned it is urged upwardly to the position shown in Fig. 23 by a spring 54.

Since the foregoing operation is a counter clearing operation it is desired that the racks be free to move forwardly until arrested by the various zero stops 380 (Fig. 3) as the latter are engaged by the long teeth 378a of the counter dials 272. Accordingly, the amount key locking bails 41 (Figs. 2 and 5) are held outward during this operation to maintain the zero blocks 47 out of blocking relation with the racks 31. To accomplish this, key 23 is coupled through a pin and slot connection 602 to the aforementioned bell crank 781. Thus, when the key 23 is depressed, the link 782 (see also Fig. 16) will be moved rearward to position the shoulder 787 of link 783 over the pin 788 of lever 255. Thus, as the latter lever is rocked by cam 223 at the start of the cycle, the various key locking bails 41 will be removed from blocking relation with the racks.

What I desire to secure by United States Letters Patent is:

1. In a calculating machine having a reversible cycle counter, actuating mechanism therefor comprising the combination of an actuator for said counter, a reversible ratchet device operatively connected to said actuator, a reciprocable drive element cooperable with said ratchet device, means normally maintaining said drive element in a medial position, selectively operable means for moving said drive element in one direction or the other from said medial position whereby to advance said ratchet device in one or the other of opposite directions, respectively, and means for locating said drive element in either of two operative relations with said ratchet device whereby to enable said drive element to advance said ratchet device in one or the other of opposite directions, respectively.

2. In a calculating machine having a reversible cycle counter, actuating mechanism therfor comprising the combination of an actuator for said counter, a reversible ratchet device operatively connected to said actuator, a reciprocable drive element cooperable with said ractchet device, said drive element being effective upon reciprocation in one direction or the other from a medial position to advance said ratchet device in one or the other of opposite directions respectively, a pair of driving devices moveable in opposite directions, means for selectively coupling said drive element to one or the other of said driving devices, and means for selectively locating said drive element in either of two operative relations with said ratchet device whereby to enable said drive element to advance said ratchet device in one or the other of opposite directions, respectively.

3. In a calculating machine having a reversible cycle counter, actuating mechanism therefor comprising the combination of a rotatable actuator for said counter, a reversible ratchet device operatively connected to said actuator, a reciprocable drive element cooperable with said ratchet device, said drive element being effective upon reciprocation in one direction or another from a medial position to advance said ratchet device in one or the other of opposite directions, respectively, a pair of driving devices moveable in opposite directions, a pair of depressible control keys, means responsive to depression of one of said keys for coupling said drive element to one of said driving devices, means responsive to depression of the other said keys for coupling said drive element to the other said driving devices, and means for selectively locating said drive element in either of two operative relations with said ratchet device whereby to enable said drive element to advance said ratchet device in one or the other of opposite directions, respectively.

4. In a calculating machine having a reversible cycle counter, actuating mechanism therefor comprising the combination of a counter actuator, a reversible ratchet wheel operatively connected to said actuator, means rotatably supporting said ratchet wheel, a reciprocable drive element, said drive element having ratchet wheel engaging portions located on the diametrically opposite sides of said ratchet wheel, means for selectively moving said drive element in one direction or the other from a medial position whereby to drive said ratchet wheel in one direction or the other, and means for selectively setting said drive element to position said ratchet wheel engaging portions thereof above or below the axis of rotation of said ratchet wheel whereby to drive said ratchet wheel in one direction or the other.

5. In a calculating machine, the combination of a register, differential actuators for said register, means of selectively causing said actuators to differentially actuate said register in an additive or substractive manner, a reversible cycle counter, an actuator for said counter, a pin wheel operatively connected to said actuator, means rotatably supporting said pin wheel, a reciprocable drive element, said drive element having pin wheel engaging portions located on diametrically opposite sides of said pin wheel, a pair of machine conditioning keys, means responsive to the depression of one of said keys for conditioning said machine to move said drive element in one direction from a medial position whereby to actuate said pin wheel in one direction, said means being responsive to depression to the other of said keys for conditioning said machine to move said drive element in the opposite direction from said medial position whereby to actuate said pin wheel in the opposite direction, and means controlled by said first mentioned means for selectively setting said drive element to position said pin wheel engaging portions above or below the axis of rotation of said pin wheel whereby to drive said pin wheel in one direction or the other, respectively.

6. In a calculating machine having a reversible cycle counter, actuating mechanism therefor comprising the combination of a counter actuator, a pin wheel operatively connected to said actuator, means rotatably supporting said pin wheel, a reciprocable drive element, a pair of drive pawls on said element and located on diametrically opposite sides of said pin wheel, means normally maintaining said drive element in a medial position, said drive element being moveable in one direction or the other from said medial position to cause one or the other of said pawls to actuate said pin wheel in one or the other of opposite directions, respectively, a pair of driving devices moveable in opposite directions, a pair of depressible keys, means responsive to depression of one of said keys for coupling said drive elements to one of said driving devices, means responsive to depression of the other of said keys for coupling said drive element to the other of said driving devices, and means for selectively locating said pawls in either of two operative relations with said pin wheel whereby to enable one or the other of said pawls to advance said pin wheels in one or the other of opposite directions, respectively.

7. In a calculating machine, the combination of a register, differential actuators for said register, means for selectively causing said actuators to differentially actuate said register additively or substractively, a reversible cycle counter, an actuator for said counter, a pin wheel operatively connected to said counter actuator, means rotatably supporting said pin wheel, a reciprocable drive element, pawls on said element located adjacent diametrically opposite sides of said pin wheel, a pair of machine conditioning keys, means responsive to depression of one of said keys for conditioning said machine to move said drive element in one direction from a medial position whereby to actuate said pin wheel in one direction, said means being responsive to depression of the other of said keys for conditioning said machine to move said drive element in the opposite direction from said medial position whereby to actuate said pin wheel in the opposite direction, means normally guiding said drive element to move said pawls in a path substantially in line with the axis of said pin wheel whereby said pawls will be ineffective to drive said pin wheel, and means controlled by said first mentioned means for setting said drive element to position said pawls to one side of said axis during additive operations and to the other side of said actuator during subtractive operations whereby to drive said counter in one or the other of opposite directions, respectively.

References Cited in the file of this patent
UNITED STATES PATENTS

| | | |
|---|---|---|
| 1,207,700 | Baldwin | Dec. 12, 1916 |
| 1,637,827 | Kottmann | Aug. 2, 1927 |
| 1,817,451 | Gubelmann | Aug. 4, 1931 |
| 2,388,209 | Friden | Oct. 30, 1945 |
| 2,558,953 | Henninger | July 3, 1951 |